(12) United States Patent
Canceri et al.

(10) Patent No.: US 10,672,031 B2
(45) Date of Patent: Jun. 2, 2020

(54) DISPLAY DEVICE AND CONTENT DISPLAY SYSTEM

(71) Applicant: Eat Displays Pty Limited, Bella Vista, NSW (AU)

(72) Inventors: Adam Canceri, Bella Vista (AU); Matthew Knox, North Sydney (AU)

(*) Notice: Subject to any disclaimer, the term of this patent is extended or adjusted under 35 U.S.C. 154(b) by 19 days.

(21) Appl. No.: 15/520,755

(22) PCT Filed: Oct. 20, 2015

(86) PCT No.: PCT/AU2015/050648
§ 371 (c)(1),
(2) Date: Apr. 20, 2017

(87) PCT Pub. No.: WO2016/061626
PCT Pub. Date: Apr. 28, 2016

(65) Prior Publication Data
US 2017/0330237 A1    Nov. 16, 2017

Related U.S. Application Data

(60) Provisional application No. 62/205,037, filed on Aug. 14, 2015, provisional application No. 62/068,022, (Continued)

(51) Int. Cl.
*G06Q 30/02* (2012.01)
*G06F 3/14* (2006.01)
(Continued)

(52) U.S. Cl.
CPC ....... *G06Q 30/0261* (2013.01); *G06F 1/3231* (2013.01); *G06F 3/0304* (2013.01);
(Continued)

(58) Field of Classification Search
None
See application file for complete search history.

(56) References Cited

U.S. PATENT DOCUMENTS 7,884,807 B2    2/2011   Hoyden et al.
8,577,728 B2 *  11/2013  Jones .................. G06F 3/147
                                              705/16
(Continued)

FOREIGN PATENT DOCUMENTS

EP    2709001 A1 *  3/2014   ......... G09F 27/005
EP    2709001 A1    3/2014

OTHER PUBLICATIONS

International Search Report and Written Opinion corresponding to PCT/AU2015/050648 dated Nov. 13, 2015, six pages.

*Primary Examiner* — Patrick N Edouard
*Assistant Examiner* — Peijie Shen
(74) *Attorney, Agent, or Firm* — KA Filing LLC; Wayne V. Harper

(57) ABSTRACT

A display device (1) includes a screen (3), at least one sensor, and a processing unit (6) configured to manage content displayed on the screen (3) based on information received from the at least one sensor. The device (1) is configured to detect the presence of one or more user in the vicinity of the device (1) and display content, such as advertisements, on the screen based on information received from the sensors. A plurality of display devices may be interconnected to form a composite display system. The device/system may further use sensors to determine information/advertising content relevant to the demographic of the user(s).

17 Claims, 19 Drawing Sheets

Related U.S. Application Data filed on Oct. 24, 2014, provisional application No. 62/066,390, filed on Oct. 21, 2014.

(51) Int. Cl.

| | |
|---|---|
| *G10L 17/26* | (2013.01) |
| *G06K 9/00* | (2006.01) |
| *G09G 5/12* | (2006.01) |
| *G06F 3/03* | (2006.01) |
| *G06F 1/3231* | (2019.01) |
| *G06F 3/0481* | (2013.01) |
| *G06K 9/20* | (2006.01) |
| *G06K 9/62* | (2006.01) |
| *H04M 1/725* | (2006.01) |
| *G09G 5/14* | (2006.01) |

(52) U.S. Cl.
CPC .......... *G06F 3/0481* (2013.01); *G06F 3/1423* (2013.01); *G06K 9/00201* (2013.01); *G06K 9/00295* (2013.01); *G06K 9/2018* (2013.01); *G06K 9/6218* (2013.01); *G06Q 30/0241* (2013.01); *G09G 5/12* (2013.01); *G10L 17/26* (2013.01); *G06F 3/14* (2013.01); *G06F 2203/011* (2013.01); *G06F 2203/04803* (2013.01); *G06K 2009/00328* (2013.01); *G09G 5/14* (2013.01); *G09G 2320/0626* (2013.01); *G09G 2340/0492* (2013.01); *G09G 2354/00* (2013.01); *G09G 2356/00* (2013.01); *G09G 2360/144* (2013.01); *G09G 2370/022* (2013.01); *G09G 2370/025* (2013.01); *G09G 2370/16* (2013.01); *G09G 2380/06* (2013.01); *H04M 1/7253* (2013.01); *Y02D 10/173* (2018.01)

(56) References Cited

U.S. PATENT DOCUMENTS

| | | | |
|---|---|---|---|
| 9,128,661 B2 * | 9/2015 | Zilber | A63F 13/80 |
| 2003/0126013 A1 | 7/2003 | Shand | |
| 2006/0166702 A1 | 7/2006 | Dietz et al. | |
| 2007/0200791 A1 * | 8/2007 | Meyers | G06F 3/1446 |
| | | | 345/1.1 |
| 2007/0279315 A1 * | 12/2007 | Laves | G06F 1/1615 |
| | | | 345/1.1 |
| 2009/0031410 A1 * | 1/2009 | Schneider | H04L 63/0823 |
| | | | 726/10 |
| 2009/0063274 A1 * | 3/2009 | Dublin | G06Q 30/02 |
| | | | 705/14.1 |
| 2009/0276319 A1 | 11/2009 | Lungu et al. | |
| 2010/0001923 A1 * | 1/2010 | Zilber | A63F 3/00643 |
| | | | 345/1.1 |
| 2011/0140991 A1 * | 6/2011 | Brenneman | G06F 3/1431 |
| | | | 345/1.3 |
| 2011/0231795 A1 | 9/2011 | Cheon et al. | |
| 2012/0056902 A1 * | 3/2012 | Yoshino | G09G 3/20 |
| | | | 345/660 |
| 2013/0057553 A1 | 3/2013 | Chakravarthula et al. | |
| 2013/0097038 A1 * | 4/2013 | Potter | G06Q 30/00 |
| | | | 705/21 |
| 2013/0265248 A1 | 10/2013 | Nagahara et al. | |
| 2015/0062048 A1 * | 3/2015 | Park | G06F 3/04883 |
| | | | 345/173 |
| 2015/0102995 A1 * | 4/2015 | Shen | G06F 3/013 |
| | | | 345/156 |
| 2015/0177828 A1 * | 6/2015 | Bruderek | G06F 1/3265 |
| | | | 345/156 |
| 2016/0179455 A1 * | 6/2016 | Liu | G06F 3/1454 |
| | | | 345/2.2 |
| 2017/0061930 A1 * | 3/2017 | Iuchi | G06F 3/1446 |
| 2017/0330237 A1 * | 11/2017 | Canceri | G06F 1/3231 |

* cited by examiner

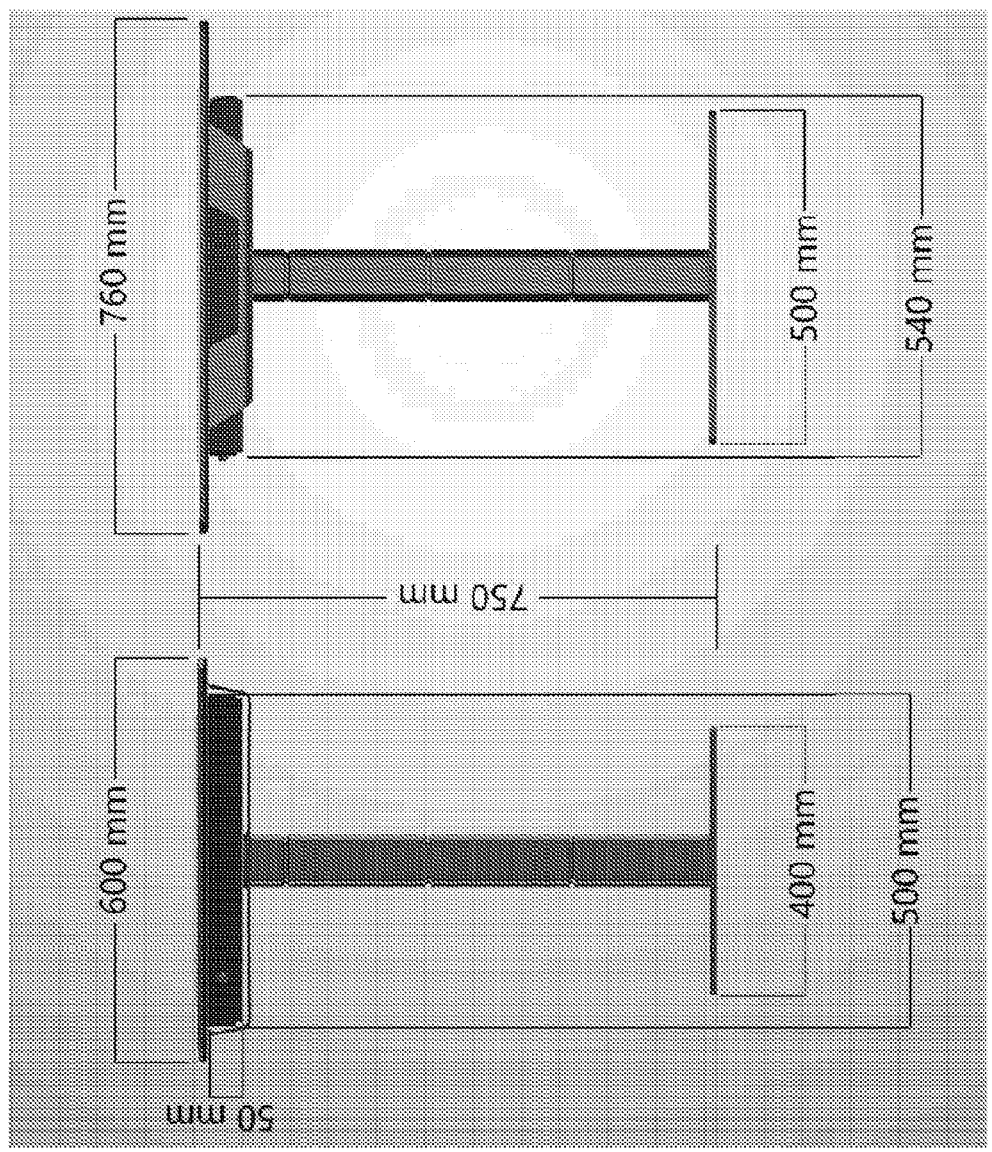
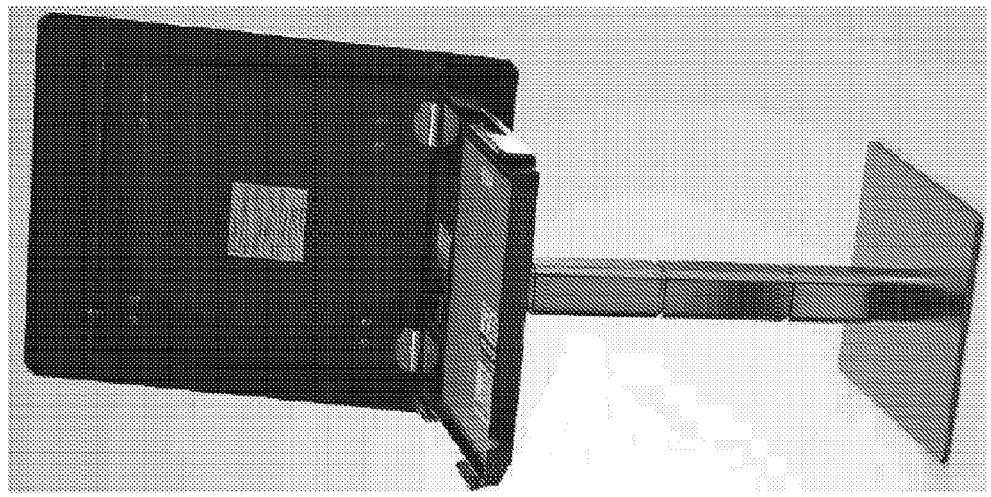
Figure 3(c)  Figure 3(d)  Figure 3(e)

Screen Orientation

Customised Ad Content Using Face Analysis - Individual

Digital Grid Mapping System

Synchronisation

Hyper-local Micro Navigation

Hyper-local Social Networking

DISPLAY DEVICE AND CONTENT DISPLAY SYSTEM

FIELD OF INVENTION

The present invention relates to display devices and content display systems, and in particular to display devices and systems for the management and display of customized content such as, for example, advertising content.

BACKGROUND OF INVENTION

In recent years, the advent of technology has drastically changed the way merchants are able to target consumers. A consumer using a wireless communication device is usually confronted with several hundred different types of advertisements during a daily period. When using a phone, email or other electronic or smart device, a consumer is usually inundated with different advertisements related or unrelated to the activity that the user is engaged in.

With the onset of increased use of wireless communication devices, it is increasingly important for merchants to target consumers quickly and efficiently. Due to the increased amount of information thrown at consumers, they are distant and uninvolved in the majority of advertisements displayed to them.

SUMMARY OF THE INVENTION

The present invention seeks to enable and encourage users to engage in meaningful e-commerce and other related online activities. This includes whilst eating and drinking, to save the user precious time, as the user can perform a number of functions at once requiring minimal physical involvement of the user.

The present invention also seeks to provide a device which is able to communicate and tailor information and advertisements to a consumer in an environment where the consumer can focus their attention on the information displayed to them and interact with the device in a meaningful way.

As used in this application, the terms "unit", "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

In one broad form, the present invention provides a display device including
 a screen;
 at least one sensor; and,
 a processing unit configured to manage content displayed on the screen based on information received from the at least one sensor.

Preferably, the at least one sensor is configured to detect the presence or absence of a user at one or more predetermined observation position in the vicinity of the display device.

Also preferably, the processing unit is configured to orient the screen and/or content displayed on the screen based on information received from the at least one sensor.

Preferably, the processing unit is configured to orient the screen and/or content displayed on the screen toward a user when present at one of the one or more predetermined observation positions.

Also preferably, when more than one user is present, at respective observation positions, the processing unit is configured to partition or split the screen such that content is simultaneously oriented toward each user at their respective observation position.

Preferably, the at least one sensor is configured to detect information related to a user(s) positioned at one or more predetermined observation positions in the vicinity of the display device.

Also preferably, the processing unit is configured to estimate or determine demographic information related to the user(s) based on information received from the at least one sensor.

Preferably, the processing unit is configured to display content on the screen appropriate to the user dependent on the demographic information.

Also preferably, the screen is positioned within or forms a table top and the one or more predetermined observation positions are one or more predetermined seating positions around the table top.

Preferably, the display device further includes a communication interface to permit data communication with external devices via a communication network or via a direct connection.

Preferably, the display device is configured to communicate with a user's mobile communication device when the user is present at one of the predetermined observation positions, and, based on that information received from the user's mobile communication device, display content relevant to the user on the screen.

Also preferably, the display device further includes a location identification means.

Preferably, the location identification unit includes a GPS receiver.

In a preferred form, the display device includes an input means for an individual to input information into the device.

Preferably, the screen is a touch screen that permits input from one or more user(s).

Also preferably, the at least one sensor includes at least one image sensor.

Preferably, the at least one image sensor is configured to capture image information of a user(s) when positioned at one of the one or more predetermined observation positions.

Also preferably based on the image information, the processing unit is configured to estimate or determine subject matter relevant to the user, and based on that subject matter, display content relevant to the user.

Preferably also, based on the image information, the processing unit is configured to estimate or determine demographic information related to the user, and display content relevant to that demographic.

Also preferably, the at least one sensor includes a sound sensor configured to detect sound information from a user when positioned at one of the one or more predetermined observation positions.

Preferably, based on the sound information, the processing unit is configured to determine subject matter relevant to the user(s) and based on that subject matter, display content relevant to the user(s).

Also preferably, the display device is configured to receive content for display from an external device.

Preferably, the display device is configured to receive content for display from a server connected thereto via a communication network.

Also preferably, the processing unit includes a microcomputer.

Preferably, the content is advertising content.

Preferably, the at least one sensor includes a passive infrared sensor.

Preferably, the display device includes audio and visual sensors adapted to detect speech and demographic information, and, wherein said processing unit is adapted to process a combination of said speech and demographic information to thereby display content on said screen relevant thereto.

Also preferably, the display device is embodied wherein said processor is adapted to process said information according to the number of times a word may be spoken by a user(s) located proximal to said display device.

Also preferably, the display device is embodied wherein said processor is adapted to process said information according to demographic information, including, but not limited to sex, race, facial recognition, smell or other information detected by said sensor(s) and thereby display content related to a particular user's demographic.

Preferably, the display device is embodied wherein said processor tabulates the rate of occurrence of content displayed on said display device to thereby invoice an advertiser according thereto.

In a further broad form, the present invention provides a content display system including a plurality of display devices each including at least one sensor, and, at least one processing unit configured to process information received from the at least one sensor, wherein, the plurality of display devices are configured to display content dependent on information received from the at least one sensor.

Preferably, the display system is embodied wherein the at least one processing unit is configured to determine a grouping value for each display device based on information from the at least one sensor, and, the plurality of display devices are configured to display content dependent on their grouping value.

Also preferably, display devices with the same grouping value are configured to display coordinated or synchronised content or to collectively display content.

Preferably, the at least one processing unit is configured to determine a location value for each display device indicative of the position of the display device with respect to the rest of the plurality of display devices.

Also preferably, each of the display devices includes a predetermined location value stored in memory indicative of the position of the display device with respect to the rest of the plurality of display devices when deployed in a predetermined physical arrangement.

Preferably, the display devices are configured to display content dependent on their location value and their grouping value.

Preferably, the at least one processing unit is configured to generate a cluster value for each display device dependent on their grouping value and their location value.

Also preferably, display devices are allocated the same cluster value if they have the same grouping value and are physically located adjacent one another.

Preferably, the display devices are configured to display content dependent on their cluster value.

Also preferably, display devices with the same cluster value are configured to display coordinated or synchronised content or to collectively display content.

Preferably, the at least one sensor is configured to detect the attendance of at least one user and/or information relating to at least one user at a predetermined observation position in the vicinity of the display device.

Also preferably, each of the plurality of display devices include an attendance sensor configured to detect the presence or absence said user(s) at a predetermined observation position in the vicinity of the display device, at least one user demographic or characteristic sensor configured to detect information related to the demographic or characteristics of the user(s) when at a predetermined observation position in the vicinity of the display device.

Preferably, each of the display devices includes a processing unit.

Preferably, each of the display devices includes a communication interface that permits data communication between the plurality of display devices and/or external devices.

Preferably, the display system further includes a server in communication with the plurality of the display devices.

Preferably, the server allocates content to each display device based on its cluster value.

Also preferably, the at least one user demographic or characteristic sensor includes an image sensor.

Preferably, the at least one user demographic or characteristic sensor includes a sound sensor.

Preferably, the at least one user sensor includes a passive infrared sensor.

Preferably, the display device is a display device as herein described.

Also preferably, the display device is or forms part of a table.

Preferably, said display system includes audio and visual sensors adapted to detect speech and demographic information, and, wherein said processing unit is adapted to process a combination of said speech and demographic information to thereby display content on said screen relevant thereto.

Also preferably, said processor is adapted to process said information according to the number of times a word may be spoken by a user(s) located proximal to said display device.

Also preferably, said processor is adapted to process said information according to demographic information, including, but not limited to sex, race, facial recognition, smell or other information detected by said sensor(s) and thereby display content to a particular user's demographic.

Preferably, said processor tabulates the rate of occurrence of content displayed on said display device to thereby invoice an advertiser according thereto.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention.

Broad forms of the invention described herein provide a display device, typically for displaying advertising content. However, it will be appreciated that the display device may be configured to display other types of content as required. The display device may also take a variety of forms, however generally includes a screen, at least one sensor, and a processing unit configured to manage content displayed on the screen based on information received from the at least one sensor.

Figure 1:
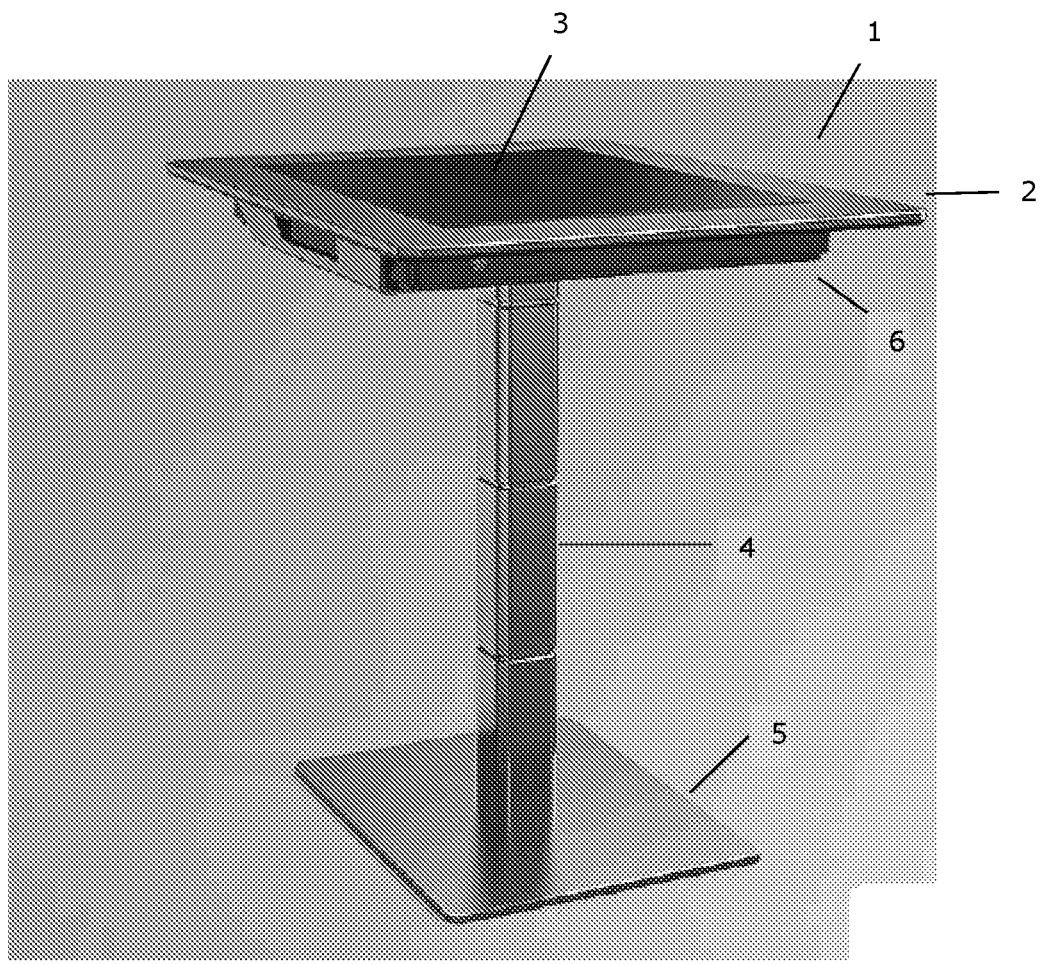
FIG. 1 is a perspective view of one embodiment of the table version display device in accordance with the present invention.

FIG. 1 illustrates a perspective view of a display device in accordance with a preferred but non-limiting embodiment of the present invention. As seen in FIG. 1, the display device, generally designated by the numeral 1 is in the form of a table, incorporating a table top 2 with a screen integrally formed therein, supported by a stand 4 and base 5. Under the table top is incorporated appropriate hardware 6 which may include a processor, for operation of the display device.

Figure 2B:
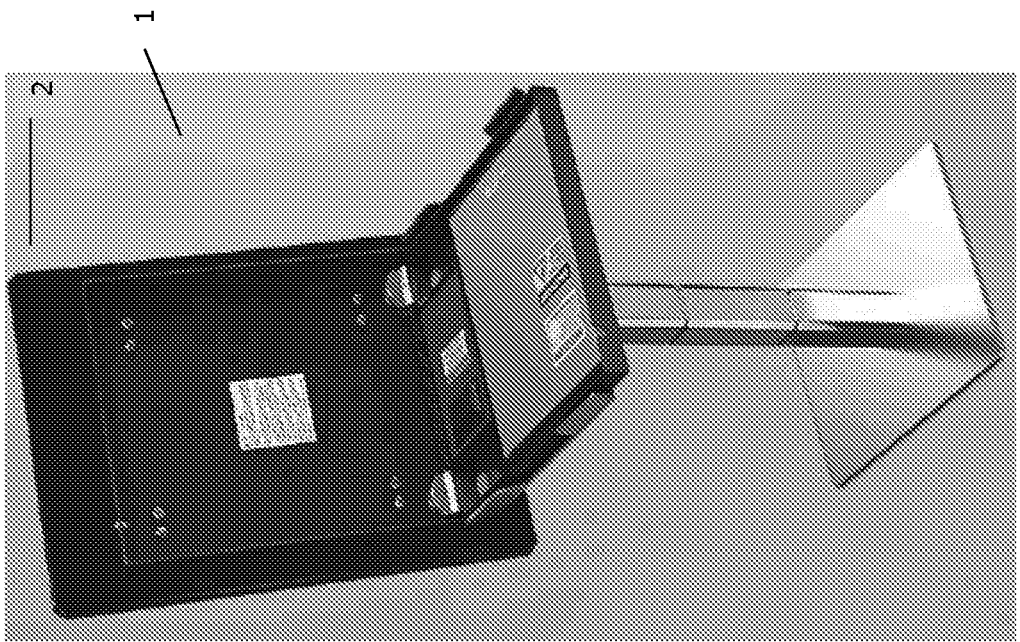
FIG. 2 shows in FIG. 2(a), how the table may be "opened", and, in FIG. 2(b) the table in the "open" position.
Figure 2A:
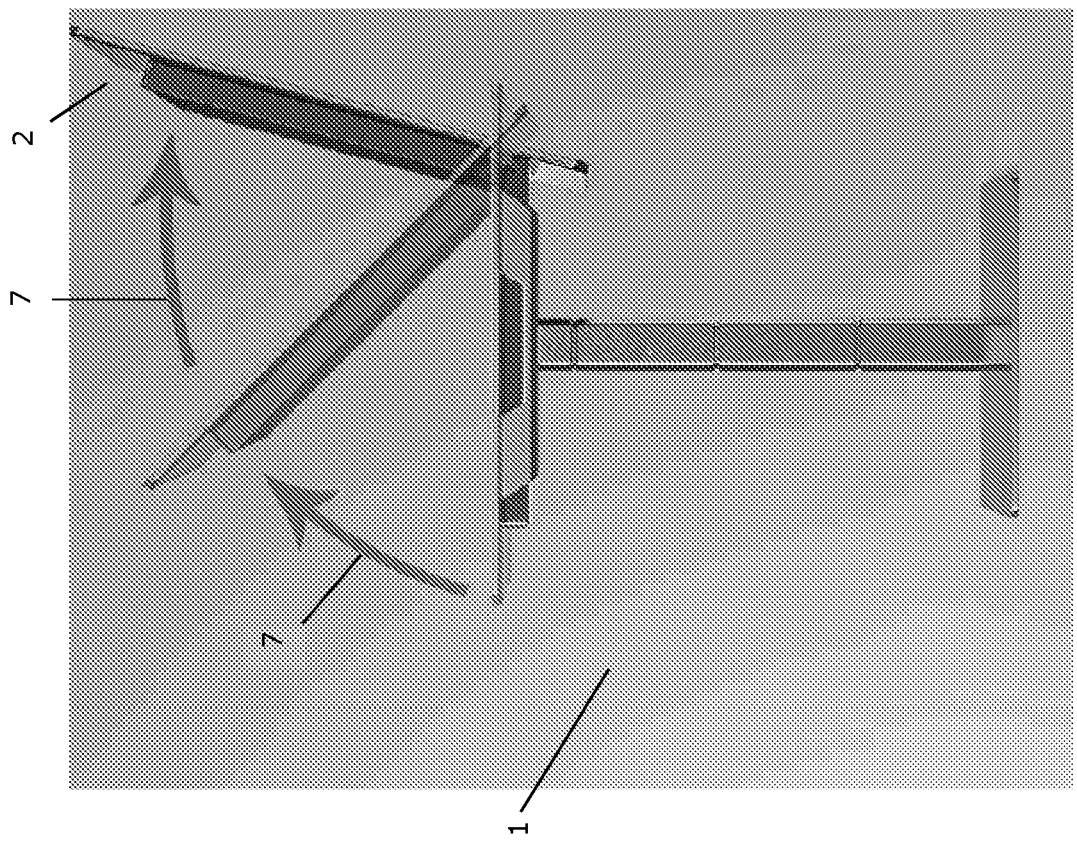

FIG. 2 illustrates in FIGS. 2(a) and 2(b), how the table top 2 may be opened as indicated by arrows 7 to an open position as shown in FIG. 2(b). This allows the hardware components 6 to be accessed for installation, servicing, etc.

Figure 3B:
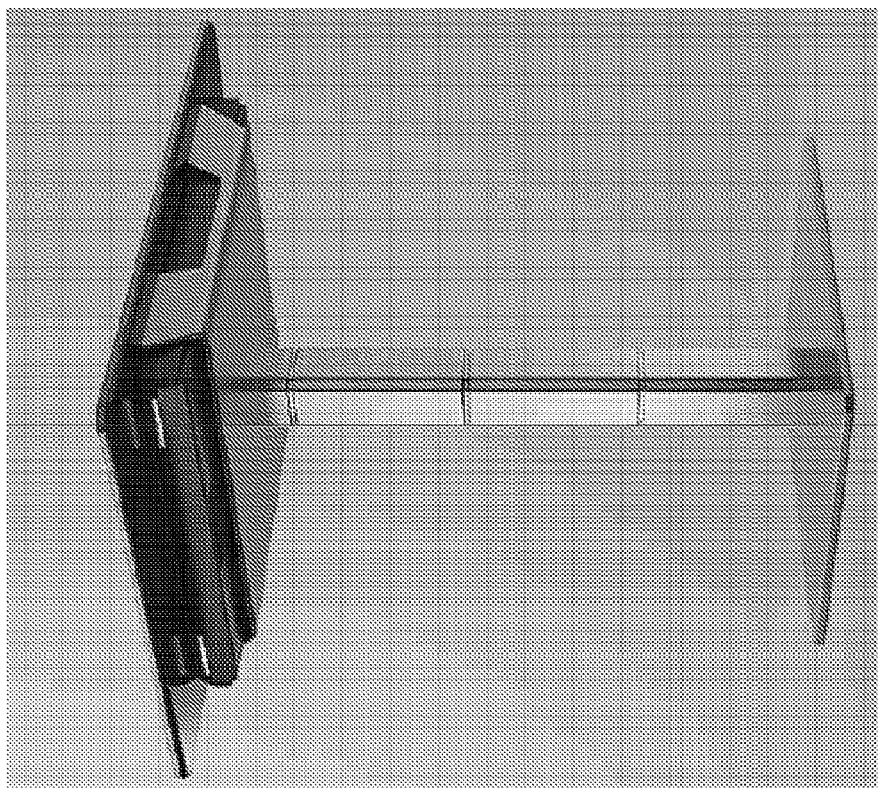
FIG. 3 shows, in FIGS. 3(a) to 3(f), a top perspective, a bottom perspective, an open perspective, a front, a side, and, a top view of the display device in accordance with the invention.
Figure 3A:
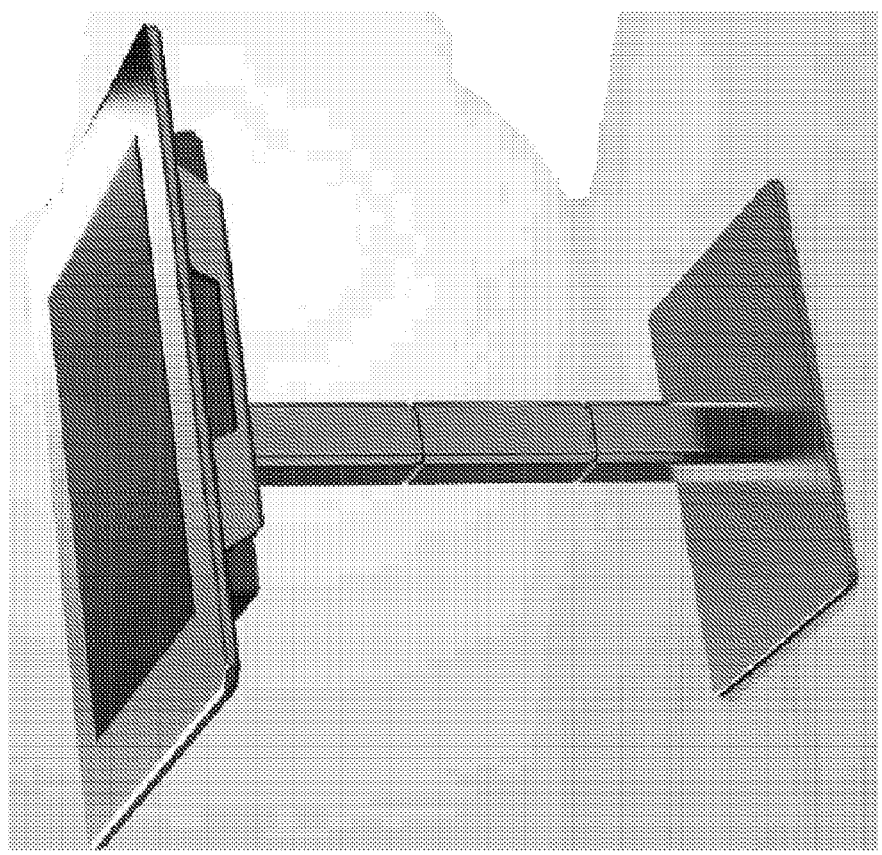
Figure 3F:
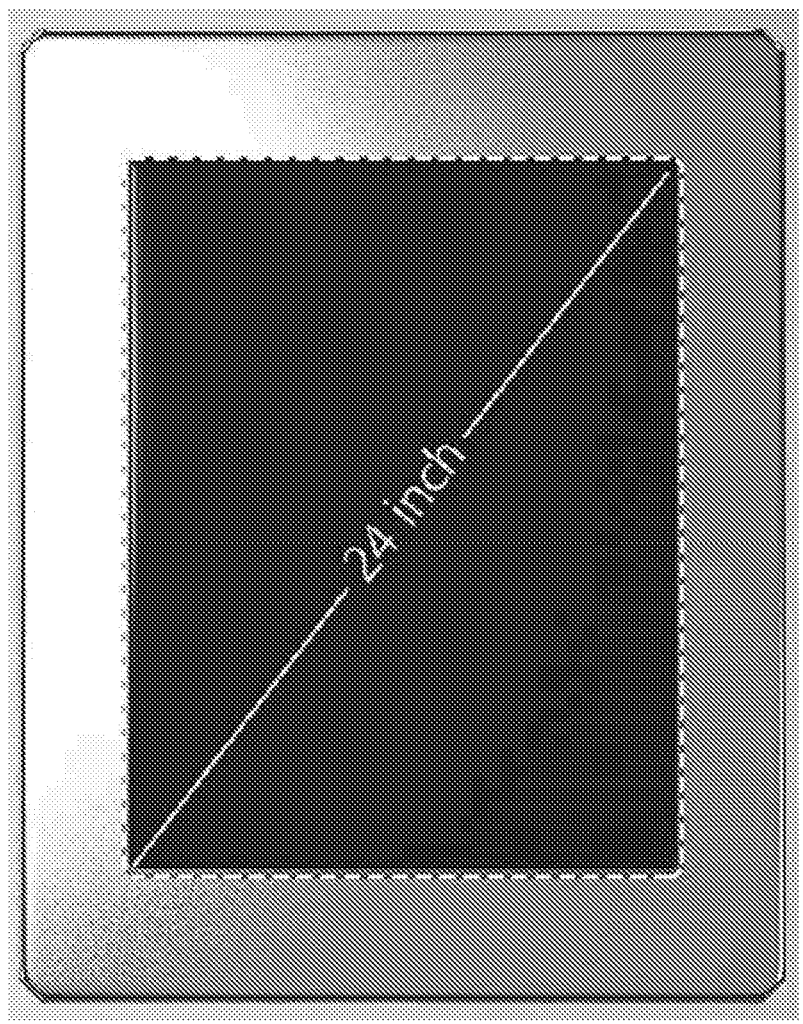

FIG. 3 shows various other views of the display device 1 in accordance with the present invention, including an alternative top perspective view shown in FIG. 3(a), and, a bottom perspective view shown in FIG. 3(b). FIG. 3(c) shows an alternative view of the open position of the display device, whilst FIGS. 3(d) and 3(e) show various side views of the device incorporating some preferred but non-essential dimensional information which illustrates that the table is of typical table height and dimension of the type typically found in a food court or coffee shop situation. FIG. 3(f) shows a top view of the display device showing the centrally located display screen 3 provided and integrally formed within the table top of the display device 1.

Figure 4:
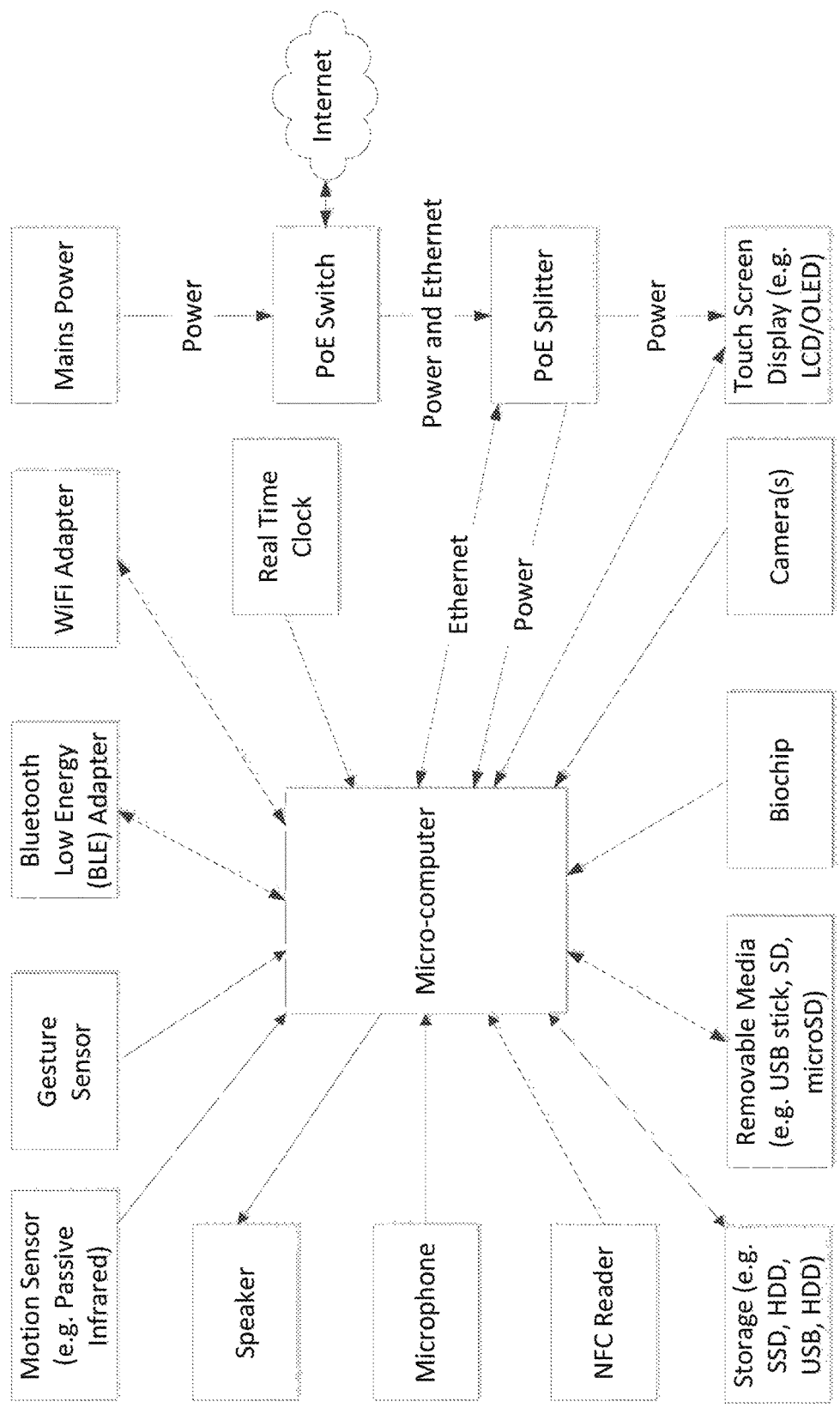
FIG. 4 is a block diagram of the typical system components of one embodiment of the display device.

Associated with the display device is one or more sensor. The sensor(s) is/are preferably provided to be not obviously visible but rather discretely and integrally formed within the table top 2 or, provided at discrete positions near to but not on the display device. Some of these sensors are illustrated in FIG. 4 and will be described hereinafter. Persons skilled in the art will appreciate that these different types of sensors may be installed in a variety of locations for their optimal operation in different environments.

As shown in FIG. 4, the device preferably incorporates a processor or microcomputer, and, a number of other hardware components, such as, but not limited to motion sensors, cameras, etc. for operation of the device as will be described hereinafter.

Figure 5:
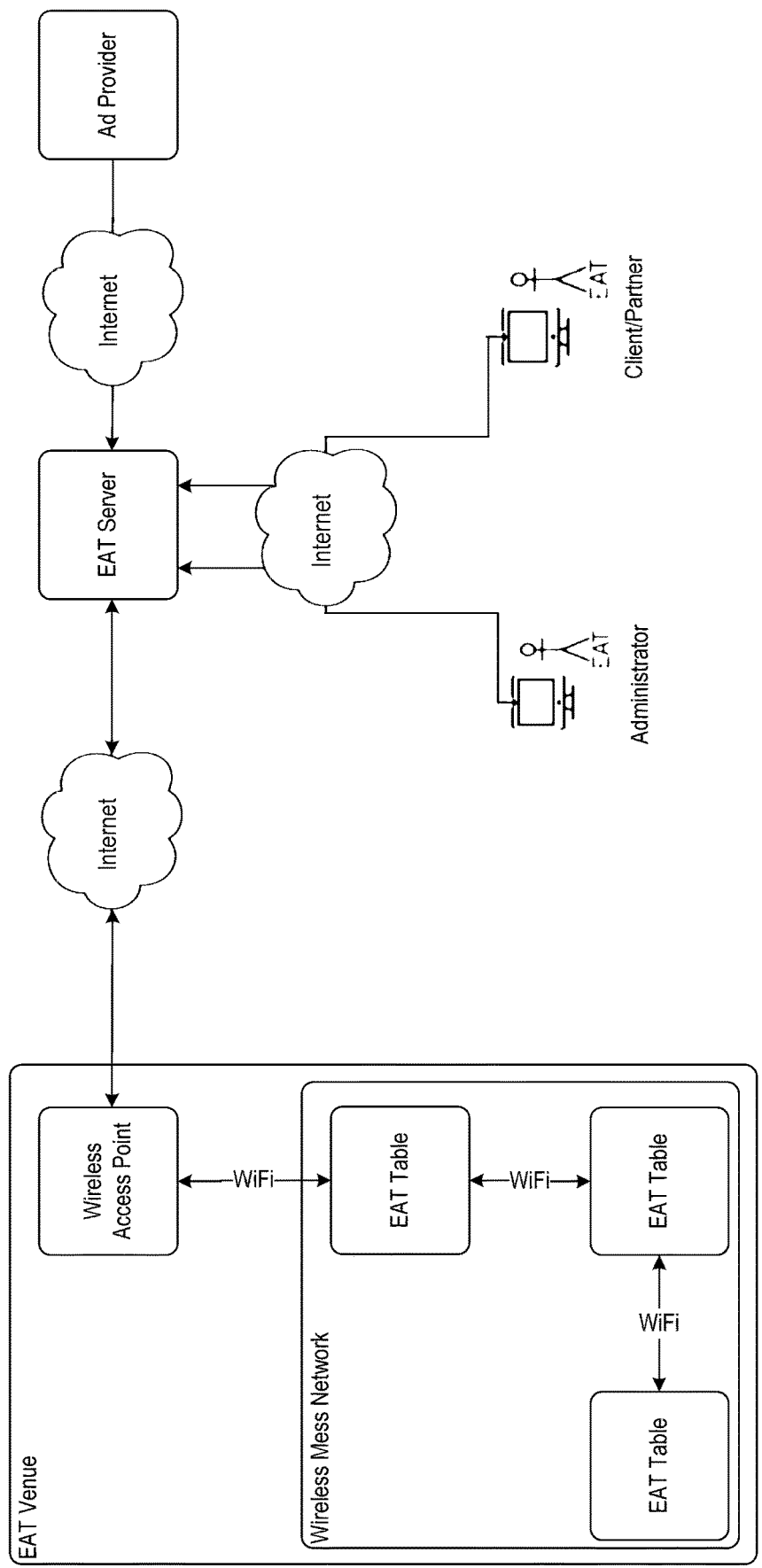
FIG. 5 is a system configuration in which the present invention may be practiced in accordance with one embodiment thereof.

FIG. 5 illustrates a display system network of three such display devices each interconnected via WiFi, and which may be typically provided in a venue such as a food court. FIG. 5 illustrates how the display devices may be connected via the internet to a remotely positioned server. Various other interconnections may be provided, such as to a remote administrator to operate the device, to an ad provider to provide advertisement content, and/or, to retailers or other client/partners associated with the operation of the device. Whilst FIG. 5 illustrates that these interconnections may be via the internet, it will be appreciated that any form of communication channel may alternatively be utilized, depending upon how far or close each of the server and/or providers are positioned from the display devices.

Figure 6:
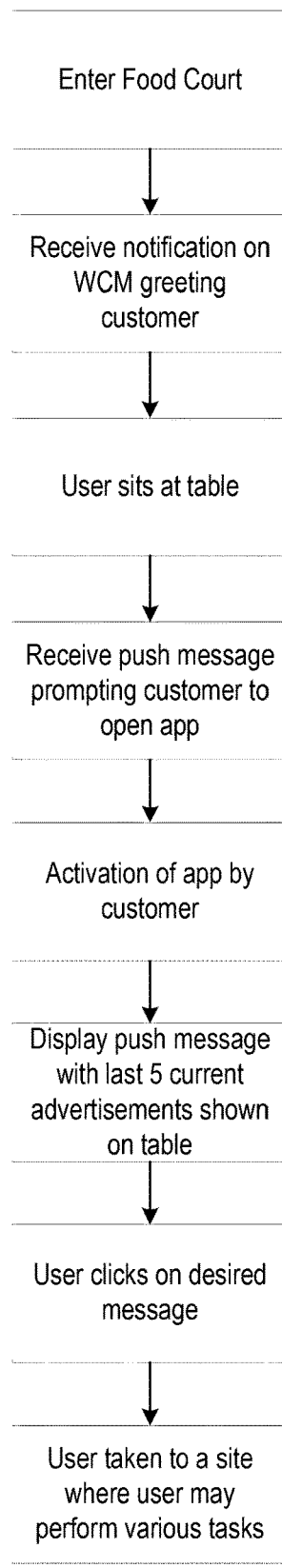
FIG. 6 is a flowchart for a method in which the invention may be practiced using the device shown in FIG. 1 with installed technologies.

In FIG. 6, is shown a typical exemplary operation of the device, wherein a customer may enter a food court and commence interaction with the display device.

Figure 7:
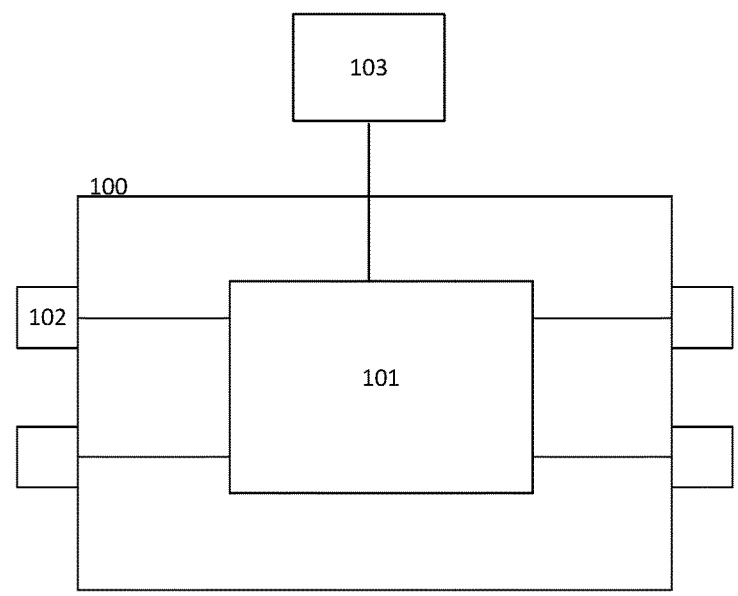
FIG. 7 shows one example of a broad form schematic of a display device.

A schematic of a broad form is the display device is shown in FIG. 7. It shows display device 100 including processing/control unit 101 (provided either insitu or remote from the screen) in connection with at least one sensor 102 (four shown) and screen 103.

Whilst several examples of the display device described herein relate to when the display device is embodied as a table which is substantially horizontally mounted, it would be understood by a skilled person that the display device may be embodied in a variety of forms, such as, for example, a stand alone kiosk, wall mounted display panel, mounted within the arms of a couch, or be substantially vertically mounted. Examples of vertical integration include wall mounting for the purpose of, for example, displaying flight times at an airport, or train times at a train station.

The at least one sensor(s) may also take a variety of forms, however one of the at least one sensor(s) is generally an "attendance" sensor configured to detect the presence or absence of an individual at one or more predetermined observation positions in the vicinity of the display device. For example, the device may be embodied as a table having a screen in the table top and several predetermined seating (or standing) positions provided near to the table. The "attendance" sensor would, for example, be configured to detect whether an individual was present at any one of the seating positions or if any one of the seating positions were empty. In one example, based on signals received form the "attendance" sensor, the processing unit may be configured to switch on the screen or switch the content displayed (e.g. wake the device from sleep mode) as an individual arrives at one of the predetermined observation positions at the display device. In one example, the "attendance" sensor include a passive infrared sensor however it will be appreciated that any sensor which may be configured to detect the presence or absence of an individual (e.g. image sensor, pressure sensor etc.).

Furthermore, based on information received from the "attendance" sensor, the processing unit may be configured to orient content displayed on the screen. In most instances, the processing unit is configured to orient content displayed on the screen toward an individual when present at one of the one or more predetermined observation positions. Considering the table embodiment described above, the processing unit may be configured to orient content displayed on the screen toward an individual as they sit at one of the seating positions around the table. The "attendance" sensor detecting the presence of the individual at the seating position and transmitting an appropriate signal to the processing unit.

When more than one individual is present, at respective observation positions, the processing unit may be configured to partition the screen such that content is simultaneously oriented toward each individual at their respective observation position. For example, the at least one "attendance" sensor may detect a first individual at one position near to the device, whilst a second individual may be detected at another position, either by the same or another "attendance" sensor. The processing unit may in turn be configured to partition the screen of the display device accordingly such that a first part thereof includes content oriented toward the first individual and as second part thereof includes content oriented toward the second individual. For example, when embodied as a table, the display device may be configured to allocate parts of the screen and/or orient content to any number of individuals seated at the table.

In addition to detecting the presence or absence of individuals, one or more of the at least one sensor(s) may be configured to detect other types of information relating to individuals when positioned at predetermined observation positions in the vicinity of the display device. For example, the sensor(s) may be able to detect information related to the individual, and, based on that information, the processing unit may estimate or determine particular characteristics of the individual and/or demographic information related to the individual. In one example, the at least one sensor may include an image sensor, and thus by analysis of images of the individual (e.g. face analysis) the processing unit may, amongst other things, estimate their age, gender or race.

Based on the estimated or determined characteristics/demographics of an individual, the display device may then display content on the screen that is more relevant to the individual. Returning to the example of when the display device is embodied as a table, if a female individual were to sit at the table, the processing unit may automatically determine her gender based on information received from a demographic/characteristic sensor (e.g. image sensor), and thus adjust the displayed content appropriately to that which is more relevant to females.

Generally, the display device includes a communication interface to permit data communication with external devices via one or more communication networks or via a direct connection. For example, the communication interface may include a Wi-Fi, Bluetooth or Ethernet adapter and typically allows communication via Local Area Networks and/or a Wide Area Network such as the Internet.

The communication interface typically permits communication between display devices such that information may be passed between display devices. For example, information related to individuals at respective observation positions of separate devices may be passed between devices in seeking to determine which devices are attended by similar individuals (e.g. having the same characteristics, or being of the same demographic). It will be appreciated that this information may be passed directly between devices and/or indirectly via other devices on a communication network (e.g. via a server).

In another example, the display device may be configured to communicate with an individual's mobile communication device (e.g. smart phone, tablet etc.) when the individual is present at one of the predetermined observation positions, and, based on information received from the individual's mobile communication device, display content relevant to the individual on the screen. Typically, an individual's mobile communication device is preloaded with software that permits communication with the display device. For example, an individual may have a smart phone preloaded with an application (mobile app) for communication with the display device.

In a shopping center type environment for example, wherein the display device may be embodied as a table, an individual may actively or passively pass information to the table via an application on their smart phone. Such information may include age, gender, personal interests, shopping habits etc. Based on that information the display device (table) may then display content (e.g. advertising content) relevant to the individual. It will be appreciated that other types of information may be sent between an individual's mobile communication device and the display device.

The display device may also include a location identification means. Typically, the location identification means includes a GPS receiver. Via the location identification means and/or by communication with neighboring display devices, the display device may determine its location relative to the other display devices. This permits neighboring devices with similar attendance profiles to be identified such that synchronous and/or coordinated content may be displayed across several display devices. For example, a group of neighboring unattended devices may collectively display a single piece of content.

In other forms, a plurality of the display devices may be deployed in a predetermined table layout and each display device preloaded with its location relative to other devices. To assist with determining its relative location, the display device may also utilize the GPS of individual's mobile communication device to which it is be connected.

The display device may also include one or more input means for an individual to input information into the device. Typically the screen is a touch screen that permits input from an individual. However it will be appreciated that a user may input information into the device in a variety of ways, including via their mobile communication device (e.g. smart phone).

As previously described the at least one sensor may take a variety of forms, and thus the processing unit may be configured to estimate or determine information about an individual based on a range of different types of input from a range of different types of sensors. For example, the at least one sensor may include at least one image sensor. The at least one image sensor typically being configured to capture image information of an individual when positioned at one of the one or more predetermined observation positions. Based on the image information, the processing unit may be configured to estimate or determine subject matter relevant to the individual, and based on that subject matter, display content relevant to the individual on the screen. For example, the image sensor may receive image information of an individual, e.g. face information, and by analyzing the face information (e.g. for wrinkles, skin colour, facial expression), the processing unit may estimate or determine characteristics related to an individual and/or demographic information about an individual. For example, amongst other things the processing unit may estimate or determine an individual's age, gender, race or mood.

The at least one sensor may also, for example, include at least one sound sensor configured to detect sound information from an individual when positioned at one of the one or more predetermined observation positions. For example, the sound sensor may record an individual's voice, and based on the frequency, pitch or other parameters, the processing unit may estimate or determine characteristics or demographic information related to the individual. The processing unit may also be configured to identify the accent of an individual, or to detect key words spoken by the individual. Based on the sound information, the processing unit may be configured to determine subject matter relevant to the individual and based on that subject matter, display content relevant to the individual. For example, if detecting the word "perfume" the processing unit may then be configured to display perfume related content on the screen.

It will be appreciated that the display device may receive and/or store content for display in a variety of ways. For example content (e.g. advertising content) may be preloaded onto the device stored in the processing unit, local memory, and/or provided by external storage means (e.g. USB, external hard drive). The display device may also be configured to receive content for display from an external device via a communication network. In one example, the display device is configured to receive content for display from a server connected thereto via a Local Area Network.

It will also be appreciated that the processing unit may take several forms, and may be distributed in nature with several module/component. For example, the processing/control unit may include a microcontroller, controller, computer, micro-computer or other suitable electronic processing device or combination of suitable electronic processing devices.

In another broad aspect the present invention provides a content display system for managing and displaying content across a plurality of devices. Display devices may be those as described herein as well as other suitable display devices.

Generally, the content display system includes a plurality of display devices each including at least one sensor. The system also includes at least one processing unit configured to process information received from the at least one sensor. The plurality of display devices are configured to display content dependent on information received from the at least one sensor. It will be appreciated that the at least one processing unit may be included as part of one or more of the display devices and or may be located remotely to the display devices and connected thereto, for example, via a communication network (e.g. wireless Local Area Network, Wide Area Network, the internet etc.). The at least one processing/control unit may include a microcontroller, controller, computer, micro-computer or other suitable electronic processing device or combination of suitable electronic processing devices.

Figure 8A:
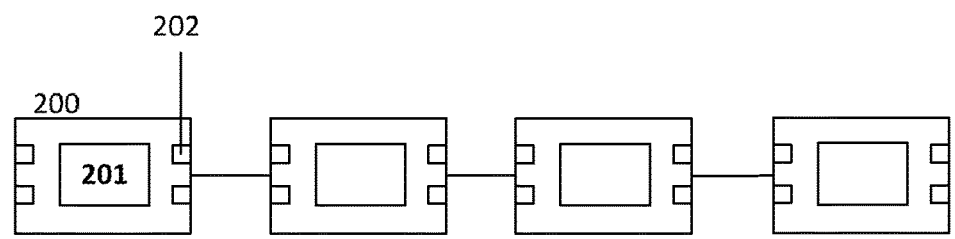
FIGS. 8(a) and 8(b) show examples of different interconnection configurations of a content display system.

FIG. 8(a) shows one broad example schematic of a content display system including a plurality of interconnected display devices 200 with sensors 202 and respective processing/control units 201. In this version of the invention, the processing/control units 201 are provided as part of the table/display device.

Figure 8B:
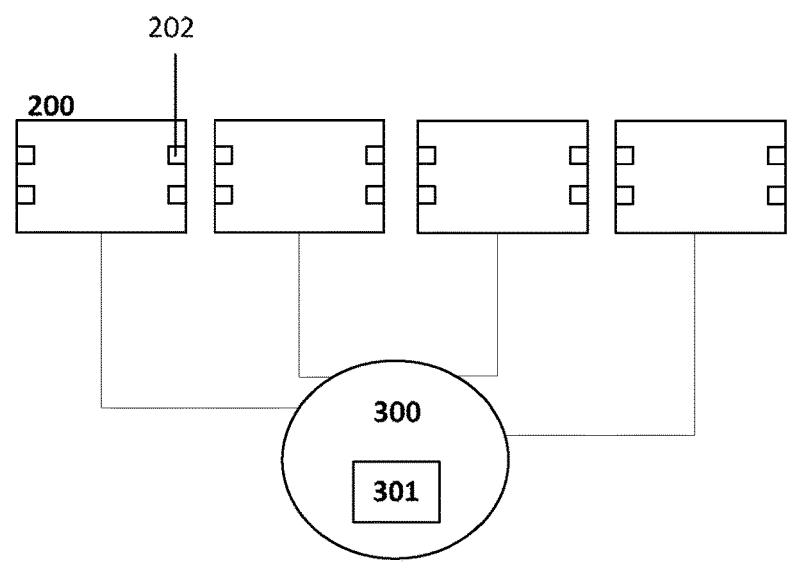
Figure 9:
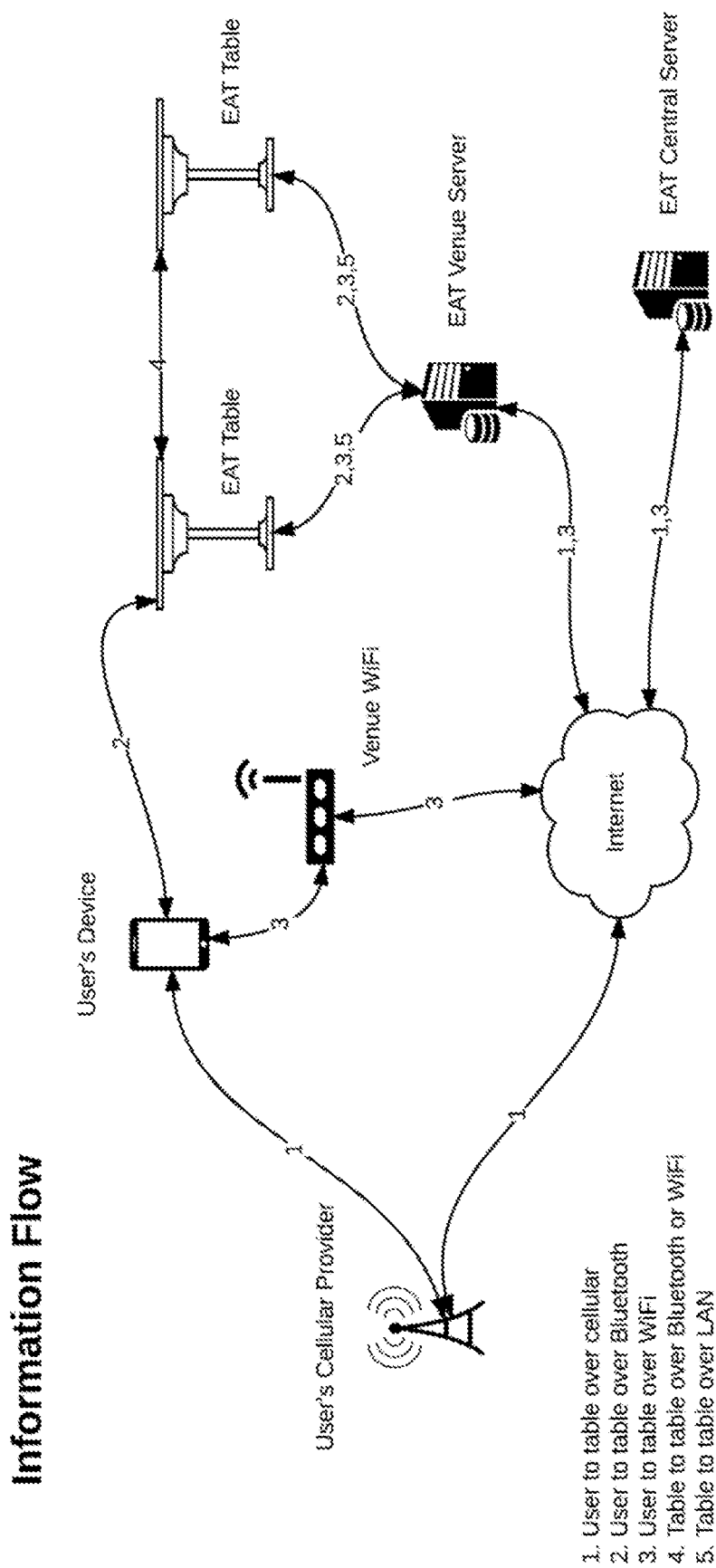
FIG. 9 shows a typical implementation of a display system, including a plurality of display devices, and showing information flow therebetween.

Another configuration is shown in FIG. 8(b) with a single centralised processing unit 301 at a remote location e.g. server. It will be appreciated that a range of configurations may exist including processing units at one or each respective display devices, and/or at a remote location thereto.

Typically the at least one processing unit is configured to determine a grouping value for each display device based on information from the at least one sensor. The plurality of display devices therefore typically configured to display content dependent on their grouping value. For example, should the display devices be those as previously described herein which include an "attendance" sensor, the grouping value may relate to the whether a display device is attended or unattended (i.e. determined based on information received for the "attendance" sensor). Those display devices with grouping values that indicate they are unattended may be configured to display a first type of content whilst those display devices with grouping values that indicate they are attended may be configured to display a second type of content. Display devices with the same grouping value may therefore be configured to display coordinated or synchronized content or to collectively display content. This has particular advantages in an advertising or entertainment context whereby several devices may collectively display a single piece of content to provide a more dramatic effect (e.g. each display device displays a portion of a single piece of content).

Each of the plurality of display devices also typically has a location value indicative of the position of the display device with respect to the rest of the plurality of display devices. In some examples the at least one processing unit may determine the location value for each display device. The location value may be determined based on information transmitted between the display devices and/or one or more location identification devices (e.g. GPS receivers). Alternatively, each display device may be preloaded with a predetermined location value in accordance with predetermined layout. For example, each display device may have a predetermined position in a known deployment pattern of the devices (e.g. grid formation).

The display devices may therefore be configured to display content dependent on their location value and their grouping value, rather than their grouping value alone. This has particular advantages in that neighboring devices with the same grouping value can be identified to collectively display content, with each device displaying a portion of the content.

Typically, the at least one least one processing unit is configured to generate/allocate a cluster value for each display device dependent on their grouping value and their location value. The display devices therefore may be configured to display content dependent on their cluster value. For example, display devices may be allocated the same cluster value if they have the same grouping value and are physically located adjacent one another. Those display devices with the same cluster value (e.g. having a physically clustered arrangement) being configured to display coordinated or synchronized content or to collectively display content.

It will be appreciated that the at least one sensor may take a variety of forms and may be an "attendance" sensor configured to detect the attendance of an individual at a predetermined observation position in the vicinity of the display device and/or may be another type of sensor to detect other forms of information relating to an individual at the predetermined observation position. The "attendance" sensor may for example include passive infrared sensor, although it will be appreciated that "attendance" sensors may include any suitable proximity type sensor or the like to determine the presence or absence of an individual.

Other types of sensors may include those which are able to detect information that may be related to individual's demographic or personal characteristics. The at least one processing unit may also determine a grouping value based on this types of information. For example, a group of display devices (e.g. tables) may have a grouping value which indicates all are being attended by females between the age of 35 and 45. On the basis of this grouping value, the same or related content may be displayed on these particular devices. Moreover, if these display are physically located adjacent one another (as indicated by their location values), they may be allocated the same cluster value. The neighboring display devices may then be combined to display relevant content in a novel or more interactive way. For example, the display devices may collectively display a single piece of content. In a shopping center type setting, where the display devices may be embodied as dining tables, this may promote interaction between individuals in attendance at the tables and a more enjoyable dining experience. Referring to the above example of a group of females between the ages of 35-45, similar or collectively displayed content and may encourage conversation with some members of the group continuing to shop together for the remainder of the day.

It will be appreciated that the at least one individual demographic or characteristic sensor may take a variety of forms and may, for example, include an image sensor. The image sensor able to capture image information related to an individual face for example with this information thereafter being utilized by the at least one processing unit to make an estimation or determination of on the individuals age, gender and mood for example.

Each of the display devices typically includes a communication interface that permits data communication between the plurality of display devices and/or external devices. For example a server may be in communication with the plurality of the display devices. The server configured to allocate content to each display device based on its cluster value. For example, each display device may transmit its grouping value and location value to the server and, based on this information, the server then may allocate a cluster value to each display device distribute content (e.g. advertising content) in accordingly.

Example 1: Electronic Advertising Table

One example of the display device as described here is an electronic advertising table (EAT) which is an interactive device which may have one or more chairs. The EAT, delivers real time advertising content to a user sitting at the table. The EAT may typically be "green technology" and may operate on solar powered re-chargeable lithium-ion batteries. The EAT is also Digital out-of-home (DOOH) and Point of Sale (POS) advertising medium which may provide dynamic media distributed through wireless (WiFi) networks installed in venues.

Referring now to FIG. 1-3, the EAT has an upper and lower portion. The lower portion of the EAT is the supporting portion and may have one or more legs. The upper portion consists of the computer, the display, and, sensor devices located in the EAT.

The EAT may take the form of a conventional table supported by a single leg, or additional legs. The EAT may have one or more chairs depending on the application. One or several sensors may be located on the surface and/or chairs of the EAT. The sensors may for example, detect heat to determine if the object is likely to be human. Alternatively, other sensors may be used to determine if the object is likely to be human, such as motion sensors or other recognition sensors. In other embodiments numerous other types of sensors, either singly or in combination may be utilized to detect and confirm if the object is likely to be human. If the sensor or sensors detects that the object is human, the EAT positions the output of the display to accommodate the location of the user. The EAT may also turn off or dim the display when the user leaves the table.

In one embodiment of the present invention, the EAT takes the form of a conventional, portable two-seater table with a single base. This type of table could be located in many areas, including, but not limited to: food courts, shopping centers, shopping malls, restaurants, cafeterias, cafes, coffee shops, bars, clubs, pubs, shops, motels, airports, hospitals, theme parks, industrial parks, hotels, food halls, public places and all other places outside one's own home containing tables. The EAT may take any form of a standard table, such as being square, circular, or rectangular. The EAT may also be any height and may be standard table height, coffee table height, or bar table height. The EAT may have multiple legs or a singular large base. The EAT may have seats connected to the base or the legs of the EAT. The seats connected to the EAT may be stationary or swivel. The EAT Table top can be used to replace any other existing table top belonging to one or more table legs that are either free or fixed to the floor surface.

In the embodiment shown in FIG. 1, the EAT unit display is attached to the device by one or more hinge components thus allowing for the rotation up and away from the device should a user desire to access the internal components. The hinges and table hardware may be manufactured of any suitable material which serves the purpose of protecting the internal components of the table. The hinges may be of any suitable type, including but not limited to; pneumatic, friction, spring, gas or hydraulic hinges.

As shown in FIG. 4, the EAT system may include any one or combination of several components, including: a motion sensor(s), a bluetooth low energy adapter (BLE), a WiFi adapter, a real time system clock, a startup/shutdown controller, a battery, one or more transistor/relay components, a touch display hover-over function, one or more cameras, one or more biochips, one or more temperature and/or humidity sensor(s), an interface for removable media, an interface for a storage component, one or more NFC readers, and a computer and/or micro-controller, a control unit, a display, a wiring loom to connect the components, and additional modules.

The EAT display portion may also be lockable, thus preventing users from accessing the internal components of the device. The display may be of any type now known or yet to be discovered which serves the purpose of the EAT. An acceptable example of a display would be a USB powered LED backlit high definition and energy efficient display monitor. The display may be manufactured out of any suitable material. In one embodiment, the display may take the form of an Organic Light Emitting Diode (OLED) due to the low power consumption, thinness, wide viewing angle, brightness and response time, but it is also envisioned that LCD type displays or any other suitable type of display including TFT displays could be used. If necessary, additional boards (e.g. a control board) may be supplied to drive the display. Further, in other embodiments, where backlighting is required, for example, when using an LCD display, a cold cathode fluorescent lamp (CCFL) inverter or similar type of unit may be supplied.

The EAT may have a touch screen display hover over function in some embodiments. The touch screen display will allow the user to interact with data and to select from several topics such as information, news, weather, health, games, social media, and shopping specials. The information selected by the user will also help the micro-controller determine what types of advertisements to display to the user.

The EAT display device may further incorporate light sensors, such that the level of brightness of the electronic display automatically adjusts using light sensors that measure the brightness of the physical location the table is in.

The EAT is powered by a control unit such as a small computer, or a micro-controller. The control unit may be reprogrammed indefinitely. In one embodiment, an acceptable computer would be the RaspberryPi type computer. In another embodiment, a microcontroller such as the Arduino or Banana Pi could be used. It is envisioned however, that any type of computer or micro-controller now known or later discovered may be used to control the device, as long as it serves the purpose necessary. The computer may be supplied with hardware adaptations which allow the computer to detect movements in the air for touch-less interaction with information and content displayed on the EAT. One example of a type of hardware adaptation, when installed, would recognize movements of a hand or other body part in different directions up to five inches away.

The EAT micro-controller or small computer may also contain technology similar to Bluetooth Low Energy (BLE) which would allow the computer to send a user highly contextual, hyper-local, meaningful messages and advertisements on their smartphones. For example, when a user sits at an EAT, an app installed on the user's smartphone would listen for the technology, and when located, trigger the technology to send a push message that would appear on the user's smartphone directing the user to open the app which in turn would enable the smartphone to display push notifications in real time and in synchronization prior push notifications. One example of this type of technology would be the iBeacon technology, but any type now known or later discovered would be acceptable if it served the same or a similar purpose.

The battery supplied may be any type necessary to run the device. In the present embodiment, the battery is a rechargeable battery, which may be removed if needed. An example of an acceptable battery would be a lithium-ion type of battery, such as the type used in laptops. Any other alternative would be acceptable, including a nanowire battery or similar type. It is further envisioned in some embodiments, that a case may be supplied to house the battery to aid in battery replacement. Further, the plastic case may include the contact point to transfer the power to the wiring loom. In other embodiments, for suitable areas, it is envisioned that the unit may be solar powered, and supplied with photovoltaic cells. In other embodiments alternative forms of energy power may be supplied, such as by converting the mechanical energy received from the movement of a user sitting in the chair into electrical energy. Other modules envisioned, include, but are not limited to, ancillary devices such as a motion sensor(s), a Bluetooth dongle, a WiFi dongle, and, a tilt detector.

In some embodiments the EAT may contain one or more motion sensors. The motion sensors may be positioned at each end of the table. The motion sensor(s) could be of any suitable type, now known or later discovered. In this embodiment, the motion sensor(s) may be of the passive infrared type, (PIR) and would serve to detect the position of a user in reference to the EAT. Once a user was detected, the motion sensor(s) would send a signal to the computer and the computer would send a signal to the display and the electronic advertisement/content displayed through the display may or may not brighten up. The display would then automatically orientate itself to face the user and display advertising content to the user.

If a second user arrives and sits at the other end of the EAT, the motion sensor(s) would detect the second user and the display would automatically split into two parts with one part displaying relevant advertising and content material to the first user, and the other part automatically orientating itself to display relevant advertising and content material towards the second user. If either party leaves the EAT, then the display automatically re-orientates and maximizes itself, and adjusts to displaying relevant advertising and content material to the party remaining at the EAT. The display remains in this position even when both parties leave and the EAT is unattended. The content displayed to each party may be identical or may be different. The content displayed to each party may be independently customized to each individual party and thus each party may view different content.

In the embodiment shown, the EAT may have a WiFi adapter and a BLE adapter. Both of which serve to deliver the advertising content individually or in combination from a centralized database to the user. Any type of wireless data communication may be used however, including similar wireless or mobile technologies including cloud technologies.

If the EAT has a BLE or Wi-Fi type adapter or other suitable similar type of technology, a consensual flow of data from a mobile app contained within the user's smart phone can transfer information from a stored user profile such as the user's age and gender which allows the EAT to display advertising content to the user through BLE or Wi-Fi embedded either within or near the EAT. This advertising content can include, but is not limited to sales, specials, promotions, coupons, competitions and other commercial activities used to promote third party businesses including the tenants belonging to the shopping center where the user is located. Also news, information, announcements, warnings, alerts and other data can be received wirelessly by the EAT.

Additionally, the EAT may obtain and utilize the information obtained from a user's mobile device passively without the user's direct interaction with the user's mobile device. When a user sits down at the EAT, the BLE or Wi-Fi adapter may pull information about the user from the user's mobile device. The EAT may then utilize the information obtained to customize the advertising content presented to the user sitting at the EAT. If multiple users sit down at the EAT, then the EAT may obtain personal information about each user from each user's respective mobile device and then customize the advertising content presented to each respective user sitting at the EAT.

In other embodiments, the EAT may also be supplied with one or more cameras. The cameras may be of any suitable type now known or later discovered. The cameras may be placed in the table and could perform any number of functions, including detecting the position of a user relative to the camera. There may also be a camera serial interface (CSI) embedded in the EAT which may use facial recognition to determine a user's approximate age and gender, so that appropriate advertising material may be displayed by the micro-controller.

In the embodiments shown in FIG. 4, the EAT may also be supplied with a biochip or DNA chips. The biochip may be embedded in the table top. The chip, when placed in contact with a user's skin, will transmit data to the micro-controller about the user. The micro-controller may then display a snapshot of the user's current health condition and also display advertisements tailored to the user based upon that information.

The EAT may also be supplied with a Near Field Communication (NFC) reader in some embodiments. The NFC reader allows the EAT to interact with NFC and Radio Frequency Identification (RFID) devices now known or later discovered, including contactless smart cards and other mobile device technology including hand held mobile device technology. The NFC reader will work in conjunction with the EAT and may possess a contactless payment system, using for example, tap and go technology thus allowing a user to purchase goods and services while sitting at the table.

In other embodiments, the EAT may have storage components, such as SSD, HDD, and USB HDD and other storage devices for storing and receiving info from the micro-controller, as well as a removable media port, such as a USB interface, a SD interface, or a microSD interface. In one embodiment, the EAT may be supplied with an SD slot and one or two USB ports. Other devices that may be supplied include a Compact Flash, a PC card, a memory stick, smart media, or an xD-picture card. Also shown in FIG. 4, is a real time system clock for displaying the time, a startup/shutdown controller, a battery (previously discussed) and a transistor relay component. The system clock may display ads in synchronization across tables or at set times. To do this, each EAT may run a network time protocol (NTP) daemon. The daemon may connect to a local time server which would be connected to an internet time server.

FIG. 5 is a system configuration in which the present invention may be practiced in accordance with one embodiment thereof. In the embodiment shown in FIG. 5, there is a venue where one or several EATs are located, such as a coffee shop, mall, or other suitable area, each EAT may contain software written to retrieve data from the network, the software for the EAT would be written to display the content to the user.

In some embodiments, the EAT server (database) may connect to each EAT through a wireless access point. Connections may be made to a secured server over a secure protocol. Unauthorized access may be dissuaded by using a non-standard port to thwart targeted attacks or prevent unauthorized access. In order to maintain or diagnose an EAT, a connection may be made to it from a laptop with an Ethernet cable or over WiFi through the router. Port knocking would preferably not be used, and login would preferably only be allowed with a public key, usernames and passwords which are adequately secure, and, intrusion prevention systems would be used to block users with multiple failures.

The central server software may be designed to upload, store and manage data on the server, that is database received from the individual EATs. The local server could use a central master server at each location and provide a single point of failure. Further, the server software may also be designed to create reports for data use, as well as receive and store data logs received from the individual EAT. The log files received from each EAT could be sent to a central location for analysis, debugging and reporting.

The operating system may be any suitable type now known or later developed which serves the purpose of the EAT. For example, a Linux kernel or Linux-like kernel may be used due to the reliability, small footprint, popularity and availability.

There are many different operating system distributions, and it is envisioned that any type now known or developed in the future may be used. Some examples of suitable OS distributions include Debian and Fedora. Others specific to a RPi small computer include Raspberian, GeeXboX ARM, DarkElec, Python, Qt or OpenELEC. The operating system of the EAT may boot from local storage, removable media, or the network. The operating system, libraries, packages, programs, drivers would all be upgradeable at any time prior or after installation. Patching and installing could be applied from removable media, or over the air using a WiFi connection, as well as over the internet. It is envisioned in some embodiments that software updates would come from a software repository mirror.

Each of the EAT tables in a specific location may require the same data. In some instances the data will need to be uploaded across all EAT's quickly. Any suitable system to manage this process is acceptable. An example of suitable systems would be bespoke, 3rd party, or a combination. Some other examples of suitable systems include BitTorrent Sync, or Riak, but any suitable substitute is acceptable. The EAT has the ability to play content while downloading all data.

The EAT server software is of any suitable type or configuration. An example of a suitable software scheme involves an administrator (a person responsible for managing the system), an advertiser (company placing the advertisements in the system), and the client (location owner). The administrator typically has the highest level of control in the system and can add create or edit the clients, locations and content contained in each EAT. Different content options may be available for each EAT depending on the client's desire. Content types may be similar to HTML 5, a zip file bundling HTML5, Javascript, CSS, and Assets, such as images, videos and popular encodings, including MP4, Quicktime, WMV and DivX. The zip file may contain a file in the root called index.html, and may contain directories and subdirectories. Examples of media servers which may be included would be XMBC or a similar type.

The content may be designed to register handlers to be notified when events happen. The events may be registered with Javascript. It is envisioned that the content may have the ability to request data from the system, and the data may be returned as a JSON object. The fields of the content may be added or edited to the clients or advertisers preference. Some fields available for editing would include the Name, for example 'summer cola promo,' status, or orientation. Each content piece will also have different orientation settings, such that the display may be in portrait or landscape display settings. Other available settings would be stretch, allowing the content to stretch to the edges of the display, or crop which would crop the content at the top and bottom or left and right depending on the orientation of the screen, so the screen is always full.

It is also envisioned that new or modified content may be set up so that approval is required prior to publishing the content. Further, uploaded content can be previewed in several different orientations. Several screens are envisioned with the EAT including but not limited to: a public page with contact information, a login or forgotten password link, a forgotten password request form, two password reset fields requiring matching passwords. A customizable home or dashboard page. This page may be customized to the preference of the user. There is also a client's list where all of the currently logged in clients may be seen by a user. Other screens envisioned would be an add/edit client screen, location screen, locations list, advertisers list, advertiser add/edit screen, content list, schedule or calendar list, and invite screen. Further descriptions and examples are attached in appendix one (EAT Server Software), appendix two (EAT Technical Notes), and appendix three (EAT Advertising System User Experience) which are incorporated in their entirety in this application.

Each individual EAT may connect to other EATs through local WiFi connections, or the EAT server through the internet. The tables may communicate with each other to distribute data, report the location of the EAT, or proximity, or for roll call purposes. Any other suitable means now known or later discovered may be used for the EAT's to communicate with each other. It is further envisioned that in some embodiments, the EAT may be aware of the location in reference to other EATs. It is also envisioned that the EAT's may be placed in a predetermined grid. Based upon this location information, appropriate advertisements or information may be programed into the device based on the location.

The network installation may include one wireless router or other wireless device with connection to the internet via DSL, ISDN 3G, 4G or similar. In areas with poor or limited WiFi coverage or where the range of the WiFi router access point (AP) does not reach all of the EAT's, additional wireless hardware may be used to extend and improve reception. In addition to the present embodiment, it is envisioned in other embodiments that data may be relayed from one table to another. In addition, other embodiments include supplying the EAT with a system which does not use a network, and uses removable media for the displayed content.

Various languages may be used for the programming of the EAT system, including but not limited to: Python, Erlang, Node.js, Qt, Java, Shell, or others such as PHP or Perl.

Information may be supplied to the EAT server electronically over the internet by the advertisement provider. In addition to advertisements, any type of information that is desired to be shared may be shown, including but not limited to information such as news, trivia, film, educational materials, television, art, and games. The EAT administrator is responsible for managing the system and may connect to the EAT server remotely or locally. The EAT client would also have access to the server remotely or locally. There may be different levels of access depending on the type of individual.

FIG. 6 is a flowchart for a method in which the invention may be practiced using the device shown in FIG. 1 with installed technologies. In the embodiment shown, a way the EAT system would function is described in FIG. 6. In this embodiment, the EAT would be located in the food court of a shopping mall. A user would enter the food court and purchase lunch. The user would receive a notification on his/her phone greeting the user. The user would approach the EAT and sit at the table.

Figure 10:
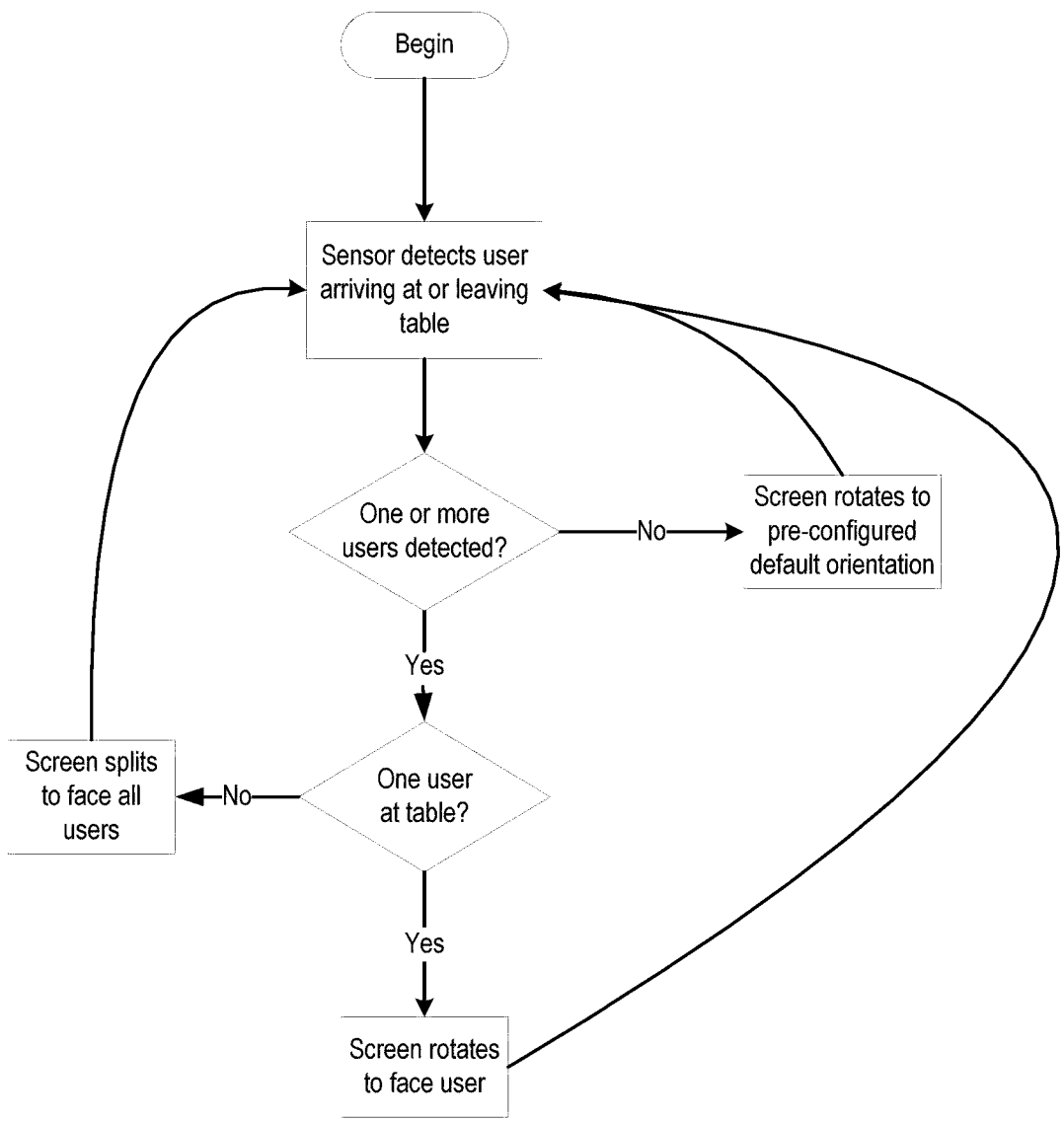
FIG. 10 shows a flowchart illustrating the screen orientation feature of the present invention.

A PIR sensor positioned at each end of the EAT would sense the user's position and orient the display towards the user, such as illustrated in FIG. 10. If another user arrives and sits at the other end of the EAT to have lunch, the display screen would automatically split into two parts, with one part displaying relevant advertising and/or content material to the first user, and the other part automatically orientating itself to display relevant advertising and/or content material towards the second user. If either party leaves then the screen automatically orientates and maximizes itself and adjusts to displaying relevant advertising and content material to the party remaining at the EAT table. The display screen remains in this position even when both parties leave and the table is unattended.

Each user would receive a push message prompting the user to open the app so that the user could receive special offers corresponding to ads displayed through the EAT. The app could be any type designed or developed by the EAT owner which are suited to the purpose of reaching the customer. Once the user activates the app, the app sends a push message with the last five current advertisements that were previously shown on the table. It is envisioned that while this embodiment uses advertisements to target the user, any type of media or information that the EAT owner desired may be accessed through the EAT. The user is able to view the message and click on the desired advertisement.

Once the advertisement is selected by the user, the user is taken to a site where they can carry out various transactions, and purchase goods and services (the app contains all payment details, full name and address details for delivery of goods to the customer, and obtain further information on the specific advertisement or announcement viewed). Other tasks which may be completed include, but are not limited to: the ability of the user to download the latest up-to-the-minute coupons/vouchers and other discounts; purchase tickets to various events/shows/movies/attractions; participate in surveys; participate in trade promotions; enter various competitions/draws/lotteries; download games or any other app; receive announcements; receive the latest news on various topics; subscribe to newsletters; sign-up as a member; vote; participate in various online forum discussions; and connect with social media sites.

Figure 11:
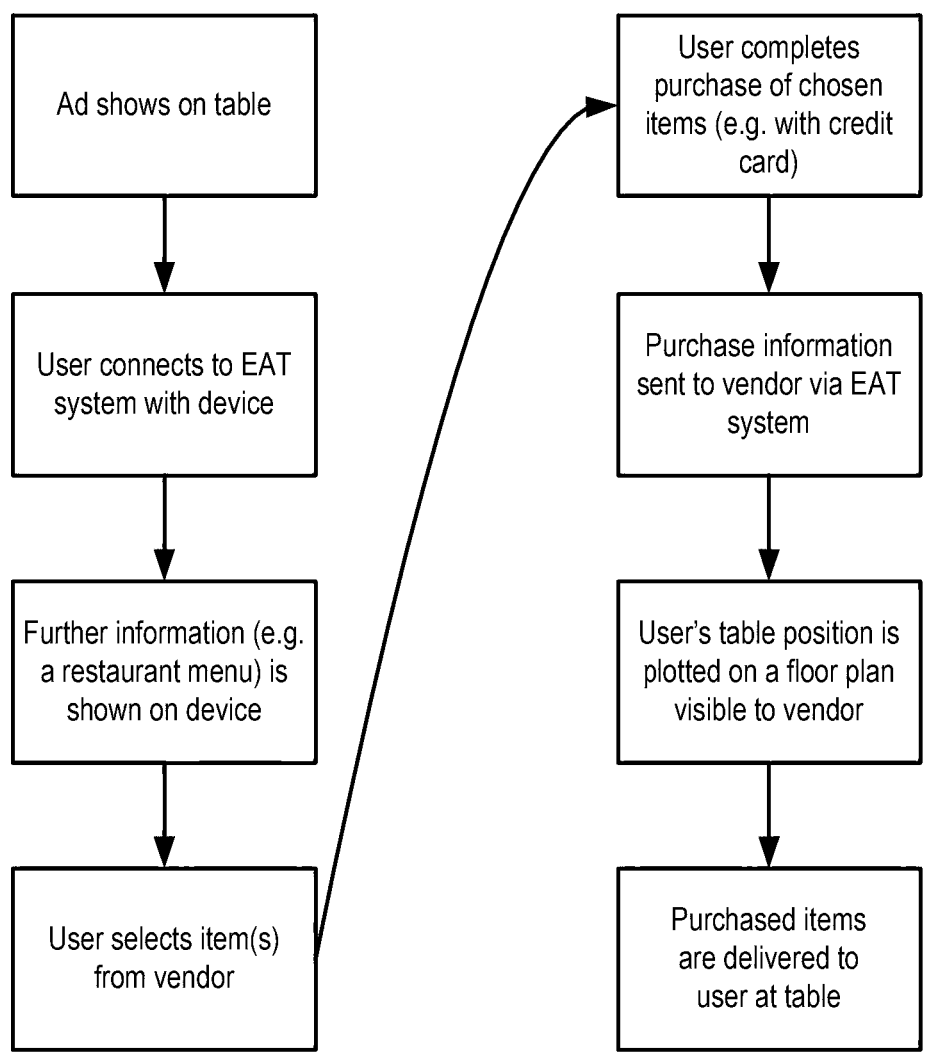
FIG. 11 shows a flowchart illustrating a typical process of a customer making purchases using the present invention.

Another real world example of how the EAT works in conjunction with a user and the roles and functions of the various devices can be best described in the following scenario, and/or is illustrated in FIG. 11. A user (Sofia) purchases a salad for her lunch in a food court containing over 200 EATs. Sofia approaches an EAT containing two seats. (In this embodiment, the EAT will inherit the dimensions of standard food court table with two chairs. However, it is envisioned that the EAT can be made to order and replace any table top without having to replace the table leg(s)). Sofia notices that the EAT is currently displaying advertising content in synchronization (and asynchronization) with other EATs in the food court. Sofia sits on one chair at one side of the EAT. A PIR sensor (positioned either at one end or at each end of the table) detects the position of Sofia on the EAT table and the electronic advertisement/content displayed through an OLED display screen (or similar energy-saving electronic display device) brightens up and automatically orientates itself to face Sofia displaying customised advertising content for her.

If Ava (Sofia's work colleague) arrives and sits at the other end of the EAT to have lunch, the display screen automatically splits into two parts with one part displaying relevant advertising and content material to Sofia and the other part automatically orientating itself to display relevant advertising and content material towards Ava.

The advertising and content displayed on the EAT is delivered by a combination of one or more of the following means: from a centralized database to the EAT via wireless data communication such as Wi-Fi, bluetooth and/or similar wireless/mobile technologies including cloud technologies; and/or removable media/storage device such as SD Cards, CompactFlash, USB sticks, PC cards, memory sticks, SmartMedia, xD-picture Cards and other removable and/or portable storage devices.

While Sofia and Ava are sitting at the EAT, there is a consensual flow of data from mobile App contained within Sofia's Smart phone through either Bluetooth Low Energy or Wi-Fi (such as Sofia's age and gender which can be extracted from a member profile within a mobile phone application (app) affiliated with the EAT system—such as, for example, shopping centre and shopping mall Mobile App). Tailored advertising content is then displayed to Sofia through Bluetooth Low Energy or Wi-Fi embedded either within or near the EAT. Advertising content can include, but is not limited to sales, specials, promotions, coupons, competitions and other commercial activities used to promote third party businesses including the tenants belonging to the shopping center where Sofia is eating her lunch at the EAT. Also news, information, announcements, warnings, alerts and other data can be received wirelessly by the EAT.

While Sofia is sitting at the EAT, a Camera Serial Interface (CSI) strategically embedded in the EAT table top uses facial recognition to determine Sofia's approximate age and gender. Advertising content relevant to Sofia's age and gender are then displayed. CSI technology can greatly enhance the efficiency and effectiveness of ads displayed through the EAT table/system.

An NFC Reader contained with the EAT will be designed to interact with NFC and RFID devices including contactless smart cards, NFC tags in Sofia's possession such as customer loyalty cards, bank cards, debit cards, credit cards and other cards with NFC tags in order to deliver relevant advertising content. NFC tags contained within packaging and other items such as the salad bowl which Sofia is eating out of will communicate with the NFC Reader contained with the EAT thereby delivering relevant advertising content in line with the theme of Sofia's healthy eating habits such as an advertisement for membership specials for a new gym opening soon.

Sofia can interact with the OLED display screen which can be responsive to touch (i.e. a touchscreen). Sofia can select a number of topics such as information, News, weather, health, games, social media and shopping specials. The topic selected by Sofia will determine the content that is displayed on the EAT. The EAT may also possess a contactless payment system using, for example, NFC technology such as "tap and go" technology, goods and services can be purchased from businesses within and outside the shopping center directly from EAT. While Sofia is having her lunch she can purchase a product from her EAT table which can be delivered to that particular EAT table using technology such as iBeacon technology.

Using a Raspberry Pi hardware adaptation, the EAT can detect hand movements in the air for touch-less interaction with information and content displayed on the EAT by just hovering Sofia's hand. The hardware adaptation can recognize up, down, left and right swipes up to five inches away. In some embodiments, the EAT System will contain iBeacon technology (or something similar) which is similar to Bluetooth Low Energy (BLE), that provides an opportunity to send customers highly contextual, hyper-local, meaningful messages and advertisements on their smartphones. When Sofia sits at an EAT in a food court, an app installed on her smartphone will listen for iBeacons and trigger the iBeacon to send a push message that appears on Sofia's smartphone. The push message directs Sofia to open the app, which in turn enables Sofia's smartphone to display up to five push notifications in real time and in synchronization with the last five of the latest advertisements displayed on the EAT.

For example, Sofia while sitting at the EAT eating her lunch, views a video advertisement from a clothing retailer (displayed through the EAT table) which announces a huge sale at the store entitling customers with special coupons up to 70% off all items. A push notification is then received on Sofia's smart phone with the link to download the coupon. In another scenario, Sofia receives a push notification stating "Special offer from Shop X" with a link to the Shop X's Sale online where Sofia can then purchase goods on sale. Therefore Sofia can essentially complete two activities at once which is to have lunch while shopping all at the same time.

Figure 12:
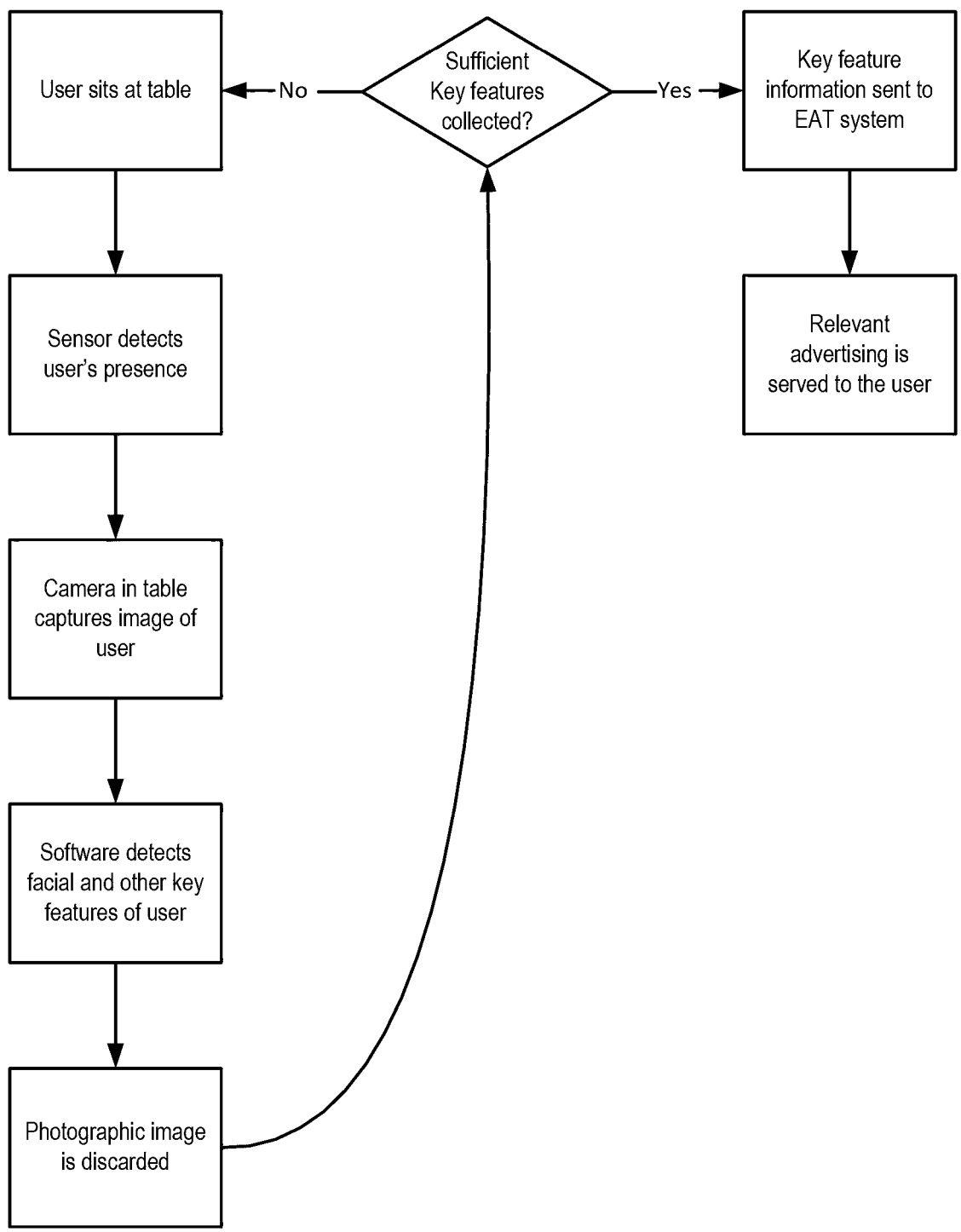
FIG. 12 describes how customized ad content may be displayed to a user using face analysis.
Figure 13:
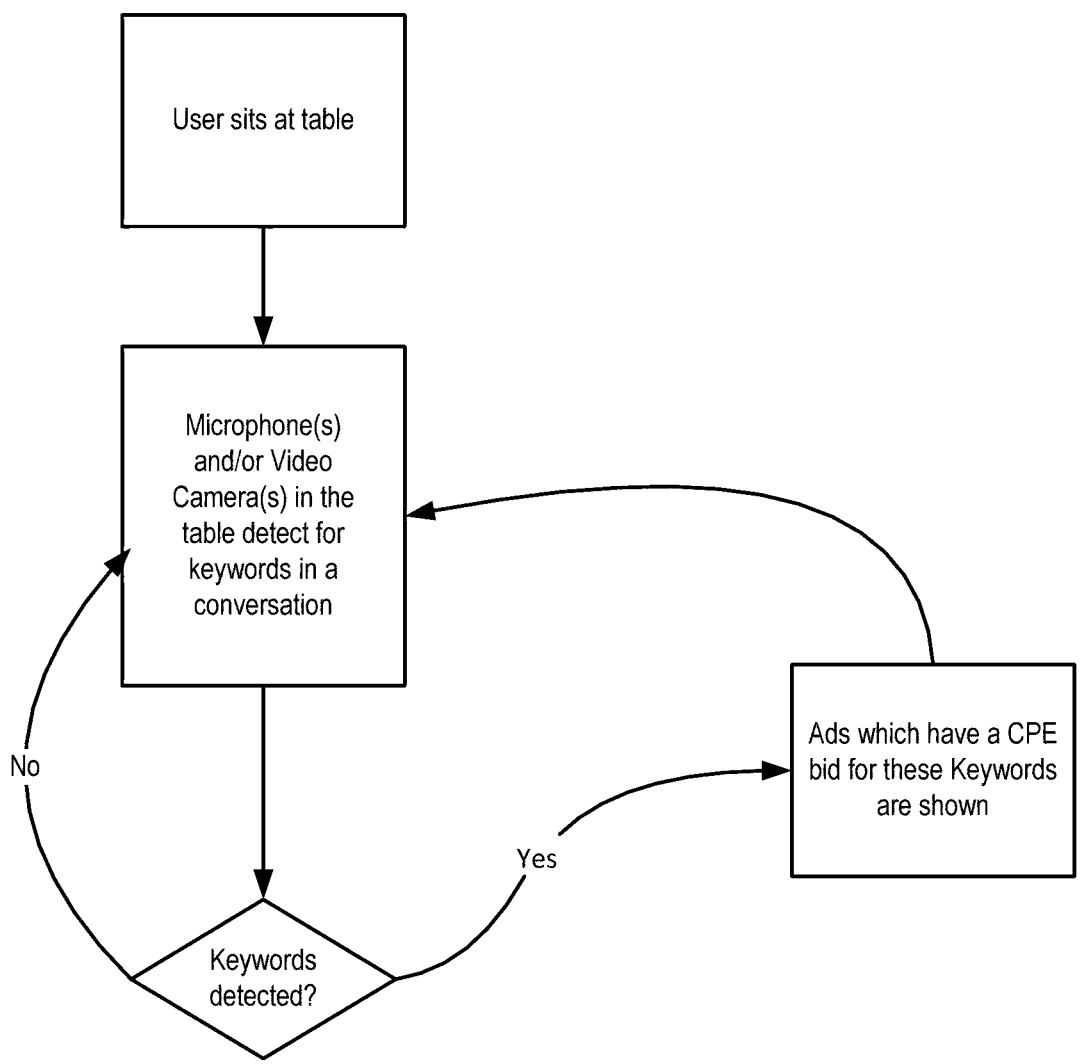
FIG. 13 shows how customized ad content may be displayed using speech analysis.

FIG. 12 illustrates how customised advertisement content can be provided to a user using facial analysis, whilst FIG. 13 shows how such content may be provided using Cost-per-Expression (CPE) through Audio (Voice) and/or Visual (Speech) Analysis.

Audio (Voice) recognition analysis occurs through the use of microphone(s) strategically positioned on the EAT Table (device) and uses voice recognition program to analyse the conversation between 2 or more people and/or a person and an electronic communication device such as a mobile phone. Visual (Speech) recognition analyses the users mouth movements, through the use of video camera(s) imbedded within the table, as individual character and syllable sounds are formed by the user during conversation (speech). As levels of background noise increase a combination of both audio (voice) and video (speech) recognition algorithms are used to more accurately detect relevant keywords in order to deliver contextual (tailored) advertising that is both relevant and useful. An algorithm can, for example, recognised the number of times a relevant keyword is detected through both Audio (Voice) and/or Visual (Speech) analysis, within a specific maximum number of seconds between the same relevant 'detected' keyword.

For example, two users (people) are having a conversation at an EAT table where the relevant keyword "shoes" is detected within 60 seconds of each other. The EAT system therefore detects an expression of interest in "shoes". Through facial recognition, it is also ascertained that one or both of the users participating in the conversation are of female gender. This then prompts relevant and useful contextual advertising displaying shoe sales at various women's shoe fashion retail shops.

Advertisers can pay for advertising on a 'Cost-Per-Expression' CPE basis.

The Cost-Per-Expression (CPE) model is a unique advertising model that enables advertisers to serve highly relevant and useful as well as highly contextual, personalised and engaging advertisements to users based on the users expressions of interest revealed through Audio (Voice) and/or Visual (Speech) Analysis of (a) users conversation with other user(s)/people (either in person or on the mobile phone) over the EAT Table. Through the EAT System, advertisers can place a CPE bid on one or more keywords.

Example 2: Content Display System—EAT Clustering

The EAT System is able to identify device (herein referred to as "table") 'clusters' within a specific physical location. The purpose of identifying a cluster is to use that cluster in order to deliver relevant and useful information targeted to individual(s) and/or groups through using more than one table at one time. The interconnectedness and unison features of the EAT system may be embodied in a variety of ways, as will be apparent to persons skilled in the art from the particular exemplary embodiments herein described. Other variations and modifications will become apparent to persons skilled in the art, and these should all be considered to be encompassed by the present invention.

A 'group ad' using clustering can create a more engaging and captivating experience Table clusters are formed when:
 (i) There is a 'group' consisting of 2 or more people spread over 2 or more tables adjacent to each other (Cluster G);
 (ii) There is more than one similar 'group' adjacent to each other (Cluster G+);
 (iii) There is more than one similar individual spread over 1 or more tables adjacent to each other (Cluster I+);
 (iv) There are 1 or more vacant tables adjacent to each other (Cluster V).

The tables 'talk' to each other through the grid system to identify different combinations (and permutations) of clusters (e.g. G, G+, I+, V, GG+, GI+, GV, G+V, I+G+, I+V) in which to depict ads.

The reason why this is an important unique feature of the EAT System is because it demonstrates the interconnectivity between the tables (devices) in order to creating different advertising space (size, shape) options for businesses wanting to put forward their message/advertisement using more than just one table. For example a business can bid/purchase air time on 'clusters' of 2 or more vacant and/or occupied tables, located at either one or more venues, in order to create a more engaging experience for customers at the venue(s).

Figure 16:
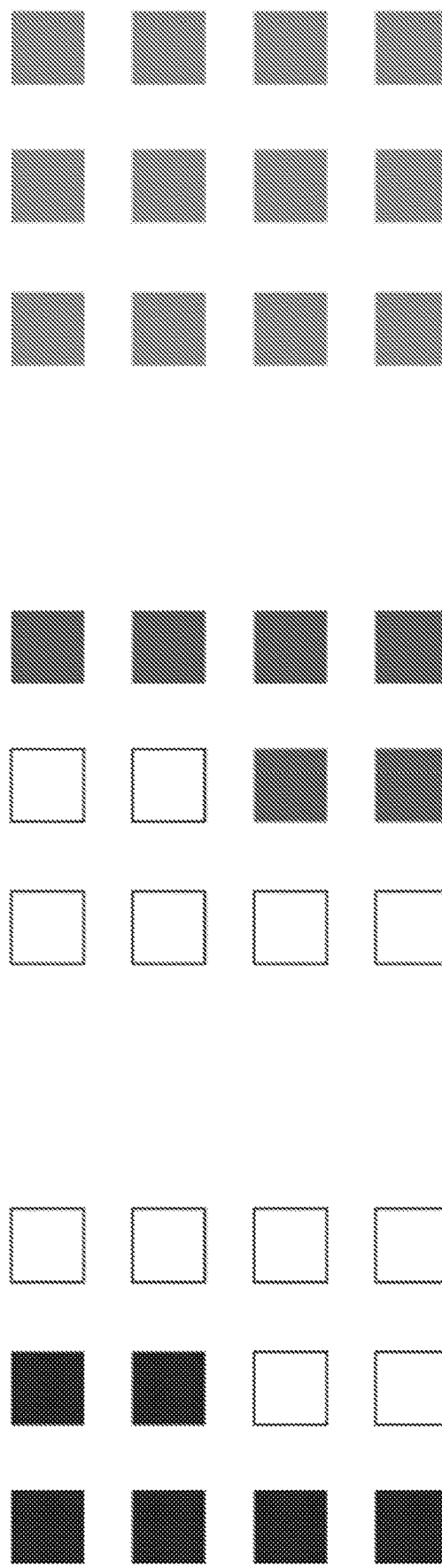
FIG. 16 shows in FIGS. 16(a), 16(b) and 16(c) typical cluster groups A, B, and AB, respectively, to illustrate the clustering feature of the present invention.

As stated before, it also enables advertisers to create greater engagement by targeting (similar) groups of 2 or more people. Take for example, a group of 12 friends. The EAT system (through face/voice recognition and/or connection through an App) would, through various sensory technologies including facial recognition, recognise the 'group' (Group A) occupying a 'cluster' of 6 tables, as shown in FIG. 16(a). The EAT system would, through facial recognition, recognise the approximate age range of Group A. In this example let's say Group A has an approximate age range of between 20 to 25 years. An ad may then be displayed on Cluster A showing the trailer for the latest action movie. Another group of 12 friends/people, Group B, as shown in FIG. 16(b) then occupies a 'cluster' of 6 tables adjacent to Cluster A. The EAT system recognises similarities (for example, similarities in the approximate age range) between cluster A and cluster B. This then forms 'Cluster AB' containing 12 tables (devices) in total, as shown in FIG. 16(c).

Figure 14:
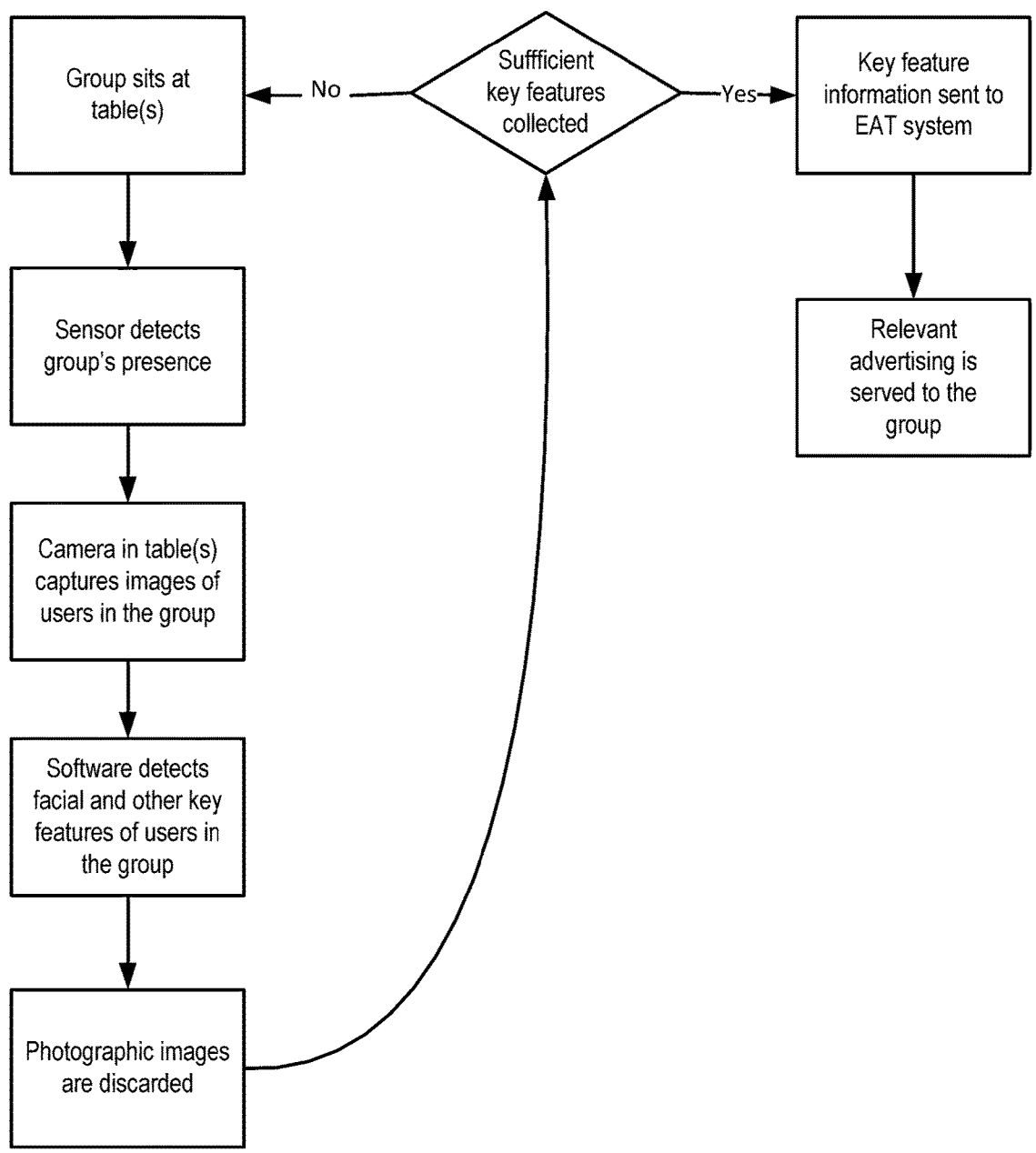
FIG. 14 shows how customized ad content may be displayed using facial recognition analysis.
Figure 15:
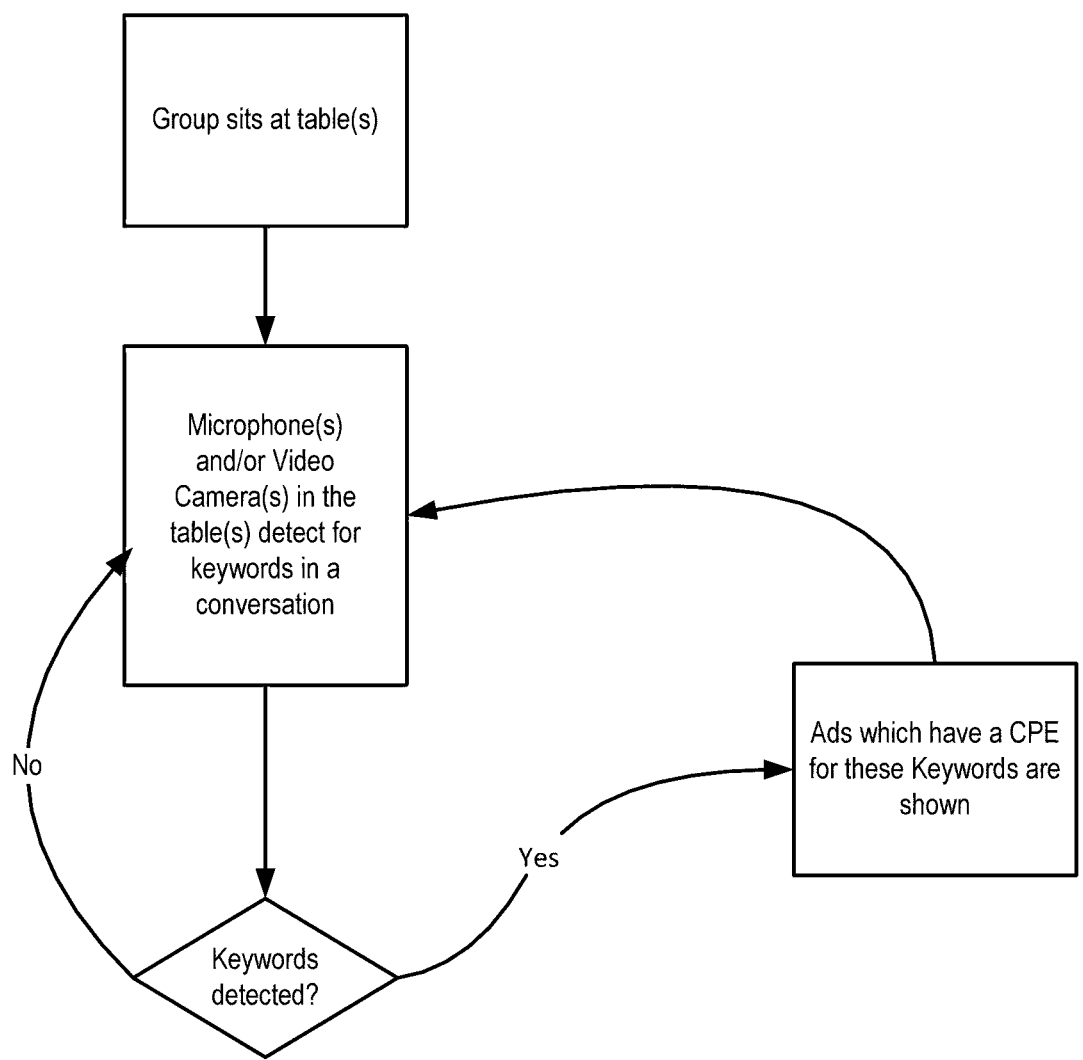
FIG. 15 shows how speech analysis may be used in a group user situation.

FIG. 14 illustrates how customised advertisement content can be utilised in the group situation using facial analysis, whilst FIG. 15 shows how such content may be provided utilising voice analysis. Obviously a combination of these can be provided.

Figure 17:
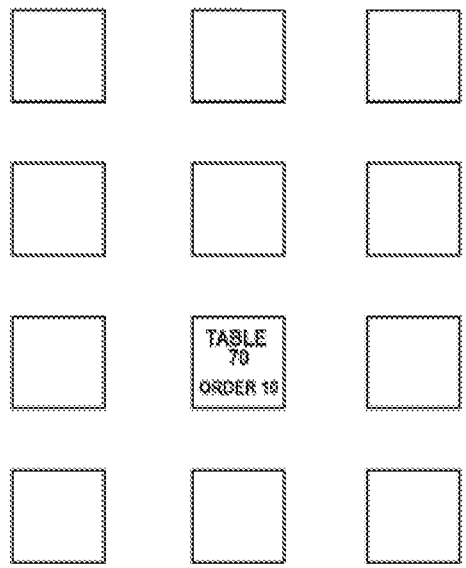
FIG. 17 illustrates a digital grid mapping system in accordance with the present invention.

FIG. 17 shows how digital grid mapping may be used to identify the particular order of a particular user at a certain table.

Figure 18:
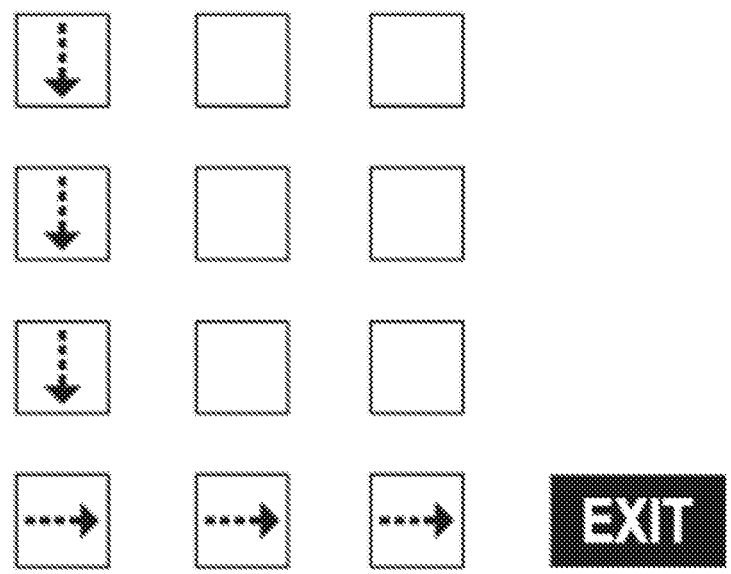
FIG. 18 illustrates the synchronization feature of the display devices in accordance with the present invention.

FIG. 18 illustrates how the tables may be synchronised to either provide collective content or direct the user to for example, an exit.

Figure 19:
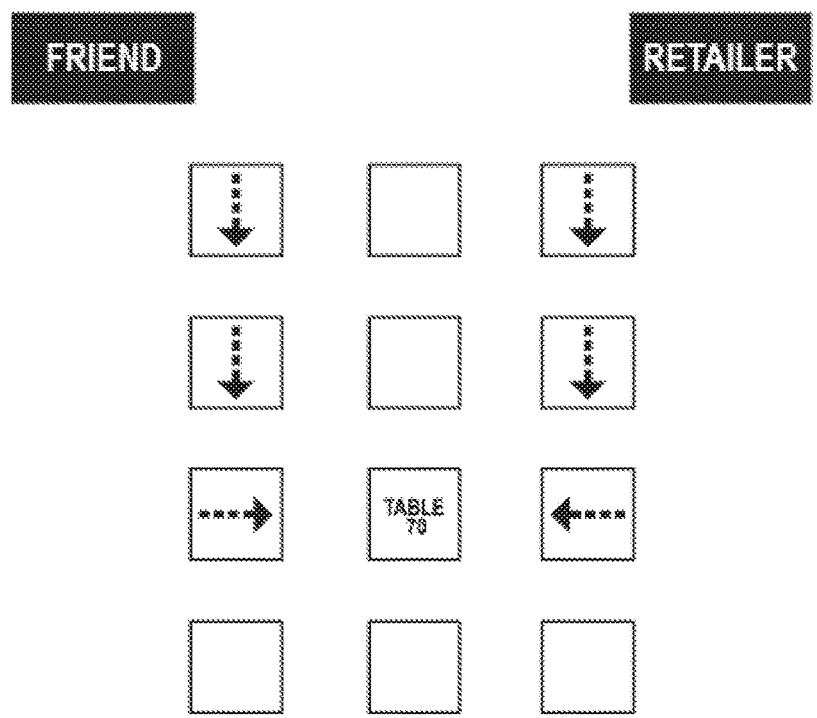
FIG. 19 illustrates the hyper local micro navigation feature in accordance with the present invention.
Figure 20:
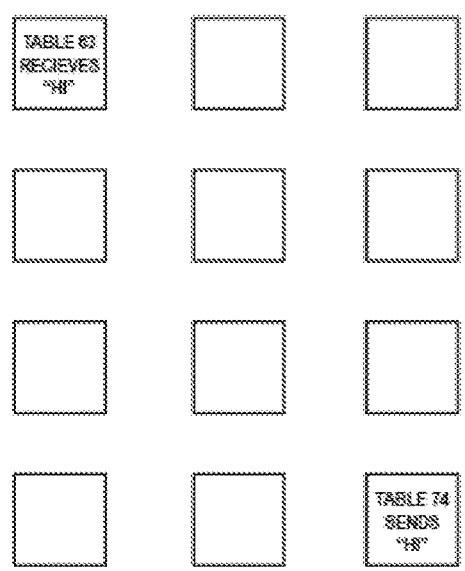
FIG. 20 illustrates the hyper-local social networking feature using the system of the present invention.

FIG. 19 illustrates how micronavigation can be utilised to direct a user's friend to a particular table, whilst FIG. 20 illustrates how social networking can be utilised between tables, the details of which would be readily understood to a person skilled in the art.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the invention. Furthermore, to the extent that the term "includes" is used in either the detailed description, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Appendix 1—EAT Server Software

Introduction

This document describes a software system to manage EAT tables.

Site Technology

The admin website will be built in HTML5.

Many screens will be formatted for mobile (narrow) devices and tablets.

An HTML5 mobile app or phone app (e.g. iOS or Android) will be built for in the field use, such as used by an engineer servicing the devices.

Terminology

| Term | Meaning |
|---|---|
| Administrator | A person responsible for managing the system |
| Advertiser | A company placing advertisements into the system |
| Client | A location owner, e.g. Shopping Complex Proprietors |
| Content | A collection of media, typically an advertisement |
| Location | A group of tables, e.g. Food Court, lower ground |

Roles
Advertiser—Place ads
Client—Owns a location.
Administrator—Highest level, Can create/edit clients
Engineer—Maintains devices
Privileges
Add/edit clients
Add/edit locations
Add/edit content
Can approve
Locations
A physical place where tables are located. Maybe be more than just a street address, e.g. level 1 and level 2 in a building would be different locations.
Table Reservations
Central management of reserved tables.
Messages show in banner on screens.
Set reservation timeout period
Set warning period
Edit banner templates, e.g.
　"This table is reserved for {user} until {reservation-end-time}"
Methods for ReservationHandler:
AddReservation(User, Location)
DeleteReservation(Reservation)
ListReservations(Location, TimePeriod)
Placing Orders
Food or product orders can be placed from tables.
Stores have access to a map of the floor plan with tables marked.
Stores only see orders placed for their business.
When an order is placed from a table that table is highlighted on the map.
Each table has a unique ID such as an integer.
Loyalty Programme
Log user visits and give rewards/points to frequent visitors.
Content
Different content options are available.
Content Types
HTML5
A zip file bundling
HTML5
Javascript
CSS
Assets such as images, videos
The zip file must contain a file in the root called index.html.
The zip file may contain directories and subdirectories.
Video
Formats such as mov, mp4, avi.
Events
Content can register handlers to be notified when events happen. Event examples:

| Event | Description | Properties Returned |
|---|---|---|
| Presence.arrive() | A person joins a table | position at table in decimal degrees, e.g. 90 |
| Presence.leave() | A person leaves a table | position at table in decimal degrees, e.g. 180 |
| Sound.level(threshold) | Sound level changes | current sound level in decibels |

Data
Content will have the ability to request data from the system. Data could be returned as a JSON object.

| Data Point | Description | Properties Returned |
| --- | --- | --- |
| DateTime | Date and time object | |
| DateTime.time | Current time as Unix timestamp | Integer, e.g 1234567890 |
| DateTime.timezone | Name of the local timezone | String, e.g. "Australia/Sydney" |
| Location | Properties for the location | |
| Location.name | Name of the location | String, e.g. Food Court |
| Location.city | Properties for the local city | |
| Location.city.name | Name of the local city | String, e.g. Sydney |
| Sound | Sound data | |
| Sound.level | Current sound level | Integer, decibels |
| Weather.current | Current weather object | |
| Weather.current.temp | Current temperature object | |
| Weather.current.temp.celsius | Current local temperature in celsius | Integer |
| Weather.current.temp.fahrenheit | Current local temperature in fahrenheit | Integer |
| Weather.forecast | Weather forecast object | |

Feeds
Set up RSS feeds
Hash Tag Support
Hashtag on Instagram etc. . . .
Add/edit
Fields
Name, e.g. Retailer Summer Promo
Status, e.g.
Orientation
Orientation
Each content piece will have orientation settings.
Portrait
Landscape
Stretch—content stretches to edges
Crop—content will be cropped top and bottom or left and right (depending on orientation) so the screen is always full
Scheduling
Content can be scheduled.
Approval
New or modified content can be set to require approval before being published.
This requirement can be applied to any content provider.
Preview
Uploaded content can be previewed in all the different orientations.
Booking Ads
Real-time bidding
Budgeting
Auctioning—price rises as ad time approaches
Per-impression charging
Packs of messages including combinations of peak and off-peak splits.
Visual Elements
Layouts
Screens
Contact Page—
A public page with contact information.
Login
Forgotten password link
Form with email address field.
Password Reset
Two password fields.
Passwords must match.
Password must satisfy password policy.
Home/Dashbiad
Content depends on the type of user.
May be customisable.
Clients List
Lists all clients the logged in user can see.
Clint Add/Edit
Add a new client or edit an existing one.
Locations List
Lists all locations the user has access to.
Location Add/Edit
Add a new client or edit an existing one.
Add/edit floorplans.
Devices List View
Lists devices (tables)
Devices Map View
Plots devices on a floor plan using distance information (derived from or signal strength).
Heatmap overlay shows pedestrian traffic.
Device Add/Edit
Add a new device to the system or edit an existing one.
Properties
uuid
status [ ]
location_id—may be null
created at
updated_at
ip
mac_ethernet
mac_wifi
mac_bluetooth
notes
Functions
add/remove/move to location
Device View
Detailed view of a device.
Device Maintenance View
See a chronology of maintenance events for a device.
Add Device Maintenance Event
Add a maintenance event for a device.
Advertisers List
Lists all advertisers the user has access to.
Advertiser Add/Edit
Add a new advertiser or edit an existing one.
Content List
Lists content a user can see.
May be filtered, e.g. list all content needing approval.
Filters can be saved and re-run.
A filter can be set as the default for a user.
Content Add/Edit
Schedule
Calendar view.
May be filtered, e.g. for a content piece, for a location, for a client.
Invite
Invite a new user to use the system.
Reports
Eye-tracking
Shows hot spots overlaid on content of where people spend most time viewing.
The content can be played back with the report running in real time overlaid.
Third Party Integration
Integration with third party content providers such as Google AdWords is possible.
Integrations will be made via public or private APIs.
Each integration will require bespoke programming to work with the provided APIs.

Common properties and concepts from the third party will be mapped into the EAT system.

Appendix 2—EAT Technical Notes

Hardware

The system comprises 2 main components, a control unit and a screen plus a wiring loom. DC powered versions will also include a battery. Many ancillaries, for example passive infra-red sensors will be required depending on customer requirements.

Control Unit—A small computer such as a RaspberryPi (RPi) or a microcontroller such as Arduino will be used. The unit is able to be reprogrammed infinitely after being installed in the table.

Screen—Various screen technologies are available for use with EAT. For example OLED, LED and LCD. The most important properties when considering a screen are heat emission, viewing angle, brightness, power consumption (especially when using restricted power sources such as batteries or PoE), physical size.

Some screen technologies require an additional board (e.g. control board) to drive the screen. If backlighting is required (LCD only) a cold cathode fluorescent lamp (CCFL) inverter or similar may also be required.

Optionally tables will be equipped with touch screens. Touch data will be sent to the control unit to allow interaction with content. Use cases may include controlling a film trailer (play, pause, fast forward, rewind for example) or answering survey questions by tapping buttons.

Battery—In units requiring DC power, a small efficient removable, rechargeable battery such as lithium-ion can be used. Alternatives such as nanowire batteries can also be used. To ease changing batteries a case made of plastic, metal or other suitable material is designed to house the battery. The case also includes the contact point to transfer the power to the wiring loom.

Individual table batteries are charged from a power source such as mains power, large capacity batteries, solar power, a combination of the above and/or other sources AC Power—When powering tables by an AC source, cabling will run to each table.

Power Over Ethernet—Power over Ethernet (PoE) can also be used to provide a DC power source. Ethernet cables would be laid underfloor. These cables carry power and network data for the table.

Wireless Power—There are various wireless power options available such as Far-field or radiative techniques.

Uninterruptible Power Supply—Optionally a venue can be equipped with an uninterruptible power supply (UPS) to provide uptime during power cuts.

Wiring Loom—A wiring loom connects wired components such as cameras, PIR sensors and screens.

Cameras—Optionally one or several cameras can be installed in the table. Cameras can be used to capture images of people sitting at the table for various purposes including age estimation, gender estimation and glasses detection. In recording mode, cameras can capture data useful in tracking eye-movement which can in turn be relayed back to reporting systems.

Microphone—A microphone will be installed. This could be used to monitor activity in the vicinity of the table. This information could be used to adjust screen brightness, switch screens on or off and provide information to dynamic content. The microphone can also be used to interact with users.

Speakers—Each table may be fitted with one or more speakers for audio output.

Passive Infrared Sensors—Tables may be fitted with Passive Infrared Sensors (PIRs). PIRs can be placed in locations suitable for detecting motion. Motion data is sent to the control unit which in turn passes it to software. The software may use this data to change the way ads are served, for example rotate ads towards the direction motion was detected or split the picture so ads can be viewed correctly oriented for several viewers.

Motion detection data can also be used to dim or switch off screens when little or no motion information is captured.

PIR sensors will also send data regarding detected temperatures which can be used to estimate if the moving object is human.

Tilt Sensors—Tables may be fitted with tilt sensors to detect when a table is tipped beyond a specific angle. Uses may include shutting down components when a table is predicted to fall to mitigate damage.

Real Time Clock—Tables are fitted with Real Time Clocks (RTC) and batteries to enable a system to power-cycle without losing time. NTP or a similar protocol keeps these clocks accurate over time.

Table Software

Data synchronization—Media to support ads will be synchronised from a server before ads are played. Media may also be streamed live.

Maintenance—In order to maintain or diagnose problems a connection to a table could made to it from a laptop with an ethernet cable or over Wi-Fi if available. Connections would be made to the server over a secure protocol such as Secure Shell (SSH). To hinder unauthorised access to this port the following actions may be performed:
  a non-standard port can be used (i.e. NOT port 22)
  this thwarts targeted attacks
  port-knocking can be used
  this means the port is not open and hence not detectable by a port scanner
  root login can be disabled
  non-root login can be enabled with cryptographic key authentication
  usernames and passwords would be adequately secure
  intrusion prevention systems can be used to block login attempts with multiple failures
  allowed ciphers are of highest known standards
  Operating System (OS)

Tables will run an operating system such as Linux, Unix-like, Microsoft Windows variants. Non-essential services are not included in the interest of security, performance and simplicity.

Distribution—There are many different OS distributions such as Debian and Fedora which are commonly used. Small computers such as RPi also have purpose built OSes which suit their environment better than a full size computer. Some examples of RPi specific OSes:
  Raspberian: has many packages, ease of use
  GeeXboX ARM: lightweight, multi-media focused
  DarkElec: XBMC focused, low CPU usage, improved Wi-Fi connectivity
  OpenELEC: XBMC focused Patching—The operating system, libraries, packages, programs, drivers and other supporting software are upgradable after installation. Patching and installing can be applied from removable media or through the network. Software updates can be served from a software repository mirror.

Booting—The operating system may boot from local storage, removable media or the network (network booting).

System Clock—Ads may be played in synchronisation across tables or at set times so it is important that the OS clock is accurate. Each device will run a Network Time Protocol (NTP) daemon. The daemon may connect to a local time server which would be connected to an internet time server or other accurate time source.

Programming

Tables will be programmable by any programming language which the operating system can support.

Examples include: Python, Go, Erlang, C, Java

Removable Media

Each table can be fitted with removable media capabilities. Some examples of supported systems

- SD card (including variations such as miniSD, microSd etc)
- Compact Flash (including versions such as CompactFlash I, CompactFlash II etc)
- USB stick
- PC Card
- Memory Stick
- SmartMedia
- xD-Picture Card Synchronization In deployments where tables in a venue must keep data in sync with each other a software system is used. Examples include: BitTorrent Sync, Riak Network Architecture Tables connect to a local area network (LAN) through hard-wiring or wireless technologies such as Wi-Fi. The LAN connects to the internet through a router. The router may connect to an internet service provider by a means such as DSL, ISDN or a cellular network. Tables connected with wireless technologies such as Wi-Fi may use one or several access points. Li-Fi may be also used. A mesh network can used to relay data from one table to another. This can help to reduce cabling. In a wireless deployment, wireless mesh networks can be implemented. This can help increase wireless range. An installation does not require a network. It is possible to serve data from removable media and other non-networked sources.

Servers

Local and central servers may be used as described in the following sections. Any "server" described below may comprise one or more physical or virtual server instances.

Local Server

Each venue may have its own local server. This server can:

- provide a mirror for content such as ads
- provide a mirror for software updates
- act a network gateway
- act as a firewall
- provide other networking facilities
- provide an access point for remote management
- provide additional computational power to tables Central Servers A central server capable of supplying service to one or several venues and customers. Features may include: Managing ads, Reporting, Managing logging, Diagnostics Central Server Software—A central server is used to manage ads. The server is hosted on the internet in a hosting center and may serve several venues and customers. Customers may also opt to host a version of the server in a location of their choice. Several installations can be made to facilitate load balancing and redundancy.

Ad/content manager—Software is provided to manage ads. This includes, for example

- uploading new content
- scheduling ads
- configuring ad campaigns
- managing advertisers
- managing venues
- Reporting—The software is capable of generating reports, for example, regarding
- ads served
- cross-venue comparisons
- data consumed by tables such as motion detection
- Logging—The software displays and provides logging data from its own actions as well as actions from the tables. This data can be downloaded.

Connectivity

Several connections are required for the system to function.

Local Server to Table Network Connectivity—The local server may connect to tables via various networking standards such as Ethernet, Wi-Fi, Li-Fi, Power-line Communication Local Server to Internet Network Connectivity—The local server may connect to the Internet via various networking standards such as Cellular network (e.g. LTE/4G, 3G), ISP (over phone lines), WiMax User-Table Connectivity WebRC—Users will be able to connect with the table using WebRC. Examples

- listen to audio
- interact with content
- register
- set preferences

Near Field Communications—A Near Field Communications (NFC) tag reader in the table will detect (when in range) an NFC tag. If the tag is known and can be used to download data about the person, targeting advertising could be displayed. The screen could also prompt the user to add their data to the system. This system would likely be operated by the location owner.

Bluetooth—The tables will support many Bluetooth profiles such as

- Advanced Audio Distribution Profile (A2DP)—for streaming audio from the table to a user's mobile phone
- Audio/Video Remote Control Profile—for controlling video playback from a mobile phone
- Personal Area Network Profile (PAN)—for creating a network between the table and a user's mobile phone
- Human Interface Device Profile (HID)—to allow a user's mobile phone to act as a keyboard to interact with the table uBeacon—uBeacon allows tables to send messages to users and have them respond. (Bluetooth 4.1)

Wi-Fi Personal Area Network—The option use Wi-Fi Personal Area Networks (PANs) will allows users to interact with tables by using their mobile phones.

Bluetooth—Bluetooth BLE (aka Bluetooth Smart) may be used to interact with mobile phone apps. BLE can also facilitate estimated distance measurements from phone to beacon (table).

Table-Table Connectivity

Tables may communicate with each to: distribute data, report their location/proximity, roll call.

Direct connectivity can be provided in several ways, some of which are described below.

Communication between tables may also be achieved through the network via a switch or hub for example.

Wi-Fi—Tables fitted with Wi-Fi may make ad hoc network connections between themselves. This may be used to synchronise data for example.

Mesh Networks—Tables may be directly connected by networking technologies such as ethernet cabling.

Table Layout

Positioning of tables in a venue can be important for utilising some features of EAT as described below.

Grids—By placing tables in a known formation it is possible to create content such as ads which span several tables.

Markings—Tables will be labelled with unique identifiers such as integers or alphanumeric codes.

Tables will also have a marking indicating upright orientation, similar to a north marker on a map. A symbol such as an arrow may be used.

Emergency Mode

In the event of an emergency the EAT system is able to be switched remotely into "Emergency mode". In this mode all ads cease and evacuation information displays.

Using the known layout of the tables, arrows towards exits may be shown as well as general information about coping with an emergency.

Tables may plot their location on their screens with a "you are here" message and marker.

poor-man's alternative is to place tables to a pre-determined grid and programme ads to suit the grid
   what happens if one table needs to be replaced?
   could manually set serial numbers into an admin page which defines the grid
   named grids (similar to standard online advertising terms), e.g. skyscraper
A subtle marker on the table top will indicate which way is "up". The marker will represent the direction considered as zero degrees on a circle.
Grid could be used for emergency broadcast
   e.g. evacuation
      arrows direct people to nearest exist
      show maps of assembly points
      accurate "you are here"

Appendix 3—EAT Advertising System User Experience

The EAT System

EAT stands for Electronic Advertising Table. The EAT connects the 'online' world with the 'offline' world and provides a new and unique platform whereby businesses[1] can connect with consumers at a level of engagement that is higher than any other digital out-of-home advertising medium.

[1] Businesses also includes other third parties.

The Electronic Advertising Table (EAT) is a revolutionary hi-tech Digital out of Home (DOOH) product concept and interactive system that provides a unique platform for businesses (and other third parties) to engage with consumers at an unprecedented level.

EAT is a unique combination of wireless, audio, visual and sensory technologies strategically embedded into a conventional table top that gathers information from its external environment, in order to deliver hyperlocal (commercial and non-commercial) content that is targeted, useful and relevant to the needs of the consumer.

EAT engages consumers at a time when they are at their most receptive and responsive, that is, when they are sitting at a table taking time out to eat, drink and relax.

EAT Tables come together to create a unique interactive system of EAT tables that work in unison with each other as well as other electronic devices (for example, Smartphones) in order to create a dynamic ecosystem of commercial and social interactivities.

EAT engages consumers at a time when they are at their most receptive and responsive, that is, when they are sitting at a table taking time out to eat, drink and relax.

Essentially EAT is a table comprised of purpose built highly energy efficient high definition digital display monitor[2] connected to a Micro-computer[3] with numerous sensors[4] and wireless technologies capable of utilising the latest developments in wireless communications and wired communication, that is, transmission of data over a wire-based communication technology.

[2] The Digital display monitor can be LED backlit or an OLED Digital display monitor (or another energy efficient digital display device). The purpose-built highly energy efficient high definition digital display monitor has minimal/negligible heat dissipation. The said Digital display monitor can utilise power via USB and/or other power options such as Power over Ethernet cable (PoE).
[3] The EAT can use a microcomputer such as a Raspberry Pi or other similar micro computers.
[4] such as, for example, CSI (camera serial interface) senses for facial recognition (age/gender) and other sensor such as PIR sensors and motion and proximity sensors.

EAT is a 'green technology' that is highly energy-efficient and can operate on purpose built rechargeable lithium-ion batteries[5] (or other battery sources) that can be recharged through renewable energy sources such as, for example, solar power. EAT is therefore portable.

[5] such as, for example, Lithium-ion battery 5V 3 A-300 aH (minimum).

EAT can also utilise power through hardwiring, that is, through power lines[6] and other power sources using metal type cabling/wire(s) such as Power over Ethernet (PoE) cables[7], uninterruptible Power Supply (UPS). Further, it is envisaged that the EAT can utilise all different types of Wireless power transfer (WPT) or wireless energy transmission[8].

[6] connected to an energy grid and/or another energy source that may be a backup electrical power generator.
[7] At this stage it is envisaged that the EAT Table will operate through Power over Ethernet (PoE) and will contain a computer system and digital displays monitor all operated and powered through the use of a single ethernet cable, either a CAT 5 or CAT 6 used to provide PoE to the EAT.
[8] That is, the transmission of electrical power from a power source to a consuming device without using solid wires or conductors.

EAT is a revolutionary Digital out-of-home (DOOH) and Point of Sale (POS) advertising medium providing dynamic media distributed through wireless networks (such as WiFi and WiGig for example) installed in venues including, but not limited to: food courts, shopping centres, shopping malls, restaurants, cafeterias, cafes, coffee shops, bars, clubs, pubs, shops, motels, airports, hospitals, theme parks, industrial parks, hotels, food halls, public places and all other places outside one's own home.

The following points below provide a brief description (in no particular order) in relation to the characteristics of the EAT and how the EAT (advertising) system will function:

(1) Sofia has purchased a salad[9] for her lunch in a food court within a shopping mall that contains over 200 EAT Tables.

[9] For details in relation to how the salad was 'purchased' please see the section below in this document titled: 'EAT Table User and Retailer Experience—Summary of sequence of events'.

(2) Sofia approaches an EAT table containing two seats. (The EAT table can inherit the dimensions of standard food court table with two chairs. However, in future, it is envisaged that the EAT table can be made to order and can include any shape or size table with one or more chairs).

(3) Upon entering the food court, Sofia notices that the EAT table is currently displaying advertising content[10] in synchronisation (and asynchronisation) with other EAT tables in the food court

[10] In this document a reference to the word 'Content' is also a reference to all 'Dynamic Content' including commercial and non-commercial content, including, but not limited to, news, weather, sport, messages, announcements and all other communication.

(4) Sofia sits on one chair at one side of the EAT table. PIR Sensor (5) A PIR sensor[11] (positioned at each end of the EAT table) detects the position of Sofia on the EAT table and the electronic advertisement/content displayed through an LED or OLED[12] display screen (or similar energy-saving electronic display device) brightens up[13] and automatically orientates itself to face Sofia displaying advertising content[14] to Sofia[15]. If Ben (Sofia's work colleague) arrives and sits at the other end of the EAT table to have lunch, the display screen automatically splits into 2 parts with one part displaying relevant advertising and content material to Sofia and the other part automatically orientating itself to display relevant advertising and content material towards Ben. If either party leaves then the screen automatically orientates and maximises itself and adjusts to displaying relevant advertising and content material to the party remaining at the EAT table. The display screen can remain in this position even when both parties leave and the table is unattended.

[11] A passive infrared sensor (PIR sensor) is an electronic sensor that measures infrared (IR) light radiating from objects in its field of view. The EAT table can also use Proximity sensors or other similar type sensors in place (or in conjunction with) PIR sensors.

[12] An OLED (organic light-emitting diode) is a light-emitting diode (LED) in which the emissive electroluminescent layer is a film of organic compound which emits light in response to an electric current.

[13] The brightness dims when nobody is present at the EAT table. EAT table can have an automatic brightness adjustment feature. However, initially this feature will not be activated as all batteries will need to drain at the same rate so they can be replaced with re-charged batteries at the same time.

[14] and other content including both commercial and non-commercial content such as news, weather, announcements, messages and other useful and relevant information.

[15] If another person then sits at the table, the screen orientates to face that person—after the current advertisement has finished displaying the current ad/content to Sofia. Advertising content is then presented equally between the occupants sitting at the EAT table (i.e. one advertisement is properly orientated and displayed for one person at one time).

Wireless Technologies-WiFi-WiGig-Li-Fi[16]-UWB[17]

[16] Light Fidelity (Li-Fi) is wireless and uses similar 802.11 protocols; but it uses visible light communication (instead of radio frequency waves), which has much wider bandwidth.

[17] Ultra-wideband.

(6) The advertising and content displayed on the EAT table is delivered by one or a combination of one or more of the following means:

i. from a centralised database to the EAT table via wireless data communication such as WiFi, WiGig[18], Li-Fi, UWB, bluetooth and/or similar wireless/mobile technologies including, but not limited to cloud based technologies and all other similar technologies; and/or

[18] Wireless Gigabit Alliance (WiGig) allows devices to communicate without wires at multi-gigabit speeds. It enables high performance wireless data, display and audio applications that supplement the capabilities of previous wireless LAN devices.

ii. removable media/storage device such as SD Cards, CompactFlash, USB sticks, PC cards, memory sticks, SmartMedia, xD-picture Cards and other removable and/or portable storage devices; and/or iii. Ethernet and/or other similar cabling that can distribute data (and/or power) to the EAT Table, from a centralised location/database.

Bluetooth Low Energy (7) There is a consensual flow of data from mobile App contained within Sofia's Smart phone[19] through either Bluetooth Low Energy or Wi-Fi (such as Sofia's age) which can be extracted from a member profile within a mobile phone application (app) affiliated with the EAT system. Tailored advertising content is then displayed to Sofia through Bluetooth Low Energy or Wi-Fi embedded either within or near the EAT table. Advertising content can include, but is not limited to sales, specials, promotions, coupons, competitions and other commercial (an non-commercial) activities used to promote third party businesses including the tenants belonging to the shopping centre where Sofia is eating her lunch. Also news, information, announcements, warnings, alerts and other data can be received wirelessly (or through Ethernet and/or other wired communication) by the EAT table.

[19] In this document, a reference to 'Smart Phone' and/or 'Mobile Phone' also includes any and all wireless electrical communication devices whether handheld or otherwise including embedded devices such as wearable wireless technology.

Camera Serial Interface (8) A Camera Serial Interface (CSI)[20] strategically embedded in the EAT table top uses a wide-angle camera together with facial recognition technology[21] to determine Sofia's approximate age and gender has well and other relevant physical attributes (such as for example a person wearing glasses, prescription or otherwise). Advertising content relevant to Sofia's age and gender are then displayed. CSI technology can greatly enhance the efficiency and effectiveness of ads (and other content and messages) displayed through and in relation to the EAT table/system.

[20] CSI also known as The CAMIF, that is, Camera Interface block is the hardware block that interfaces with different image sensor interfaces and provides a standard output that can be used for subsequent image processing.
[21] Facial recognition technology includes, but is not limited to the following techniques: Traditional Techniques whereby facial recognition algorithms identify facial features by extracting landmarks, or features, from an image of the subject's face; Three-dimensional face recognition—This technique uses 3D sensors to capture information about the shape of a face; Skin texture analysis, turns the unique lines, patterns, and spots apparent in a person's skin into a mathematical space; and Thermal Facial Recognition which is a relatively new technique that reads a persons thermal signature through an analysis of infrared images.

8(a) Eye Tracking. The CSI (and/or other similar technologies incorporated into the EAT Table) can work in conjunction with eye tracking software for the purpose of gathering information and data in relation to which advertisements and/or content where viewed by the occupant of the EAT Table and the period of time in which those advertisements and/or content where viewed and any action taken by the occupant of the EAT Table in response to the viewing.

8(b) Emotion recognition. Through CSI (and/or other similar technologies), the EAT Table is able to detect and determine (interpret) the current mood and current state of emotion of the occupant of the EAT Table. Through CSI (and/or other similar technologies) the EAT Table can gather data/information on the current state of mind, that is, mood/emotion of the EAT Table occupant and therefore display more appropriate content to the occupant in real time.

8(c) Gesture Recognition. This enables occupants of the EAT Table to communicate with the EAT Table (through human machine interaction) and interact naturally without any mechanical devices. Through gesture recognition techniques that identify and recognise posture, gait, proxemics and human behaviours, the EAT Table can better understand the body language of it's occupant thereby also building a richer bridge between the EAT Table and it's occupants.

8(d) Hyperlocal Socialising. When Sofia sits at an EAT Table she can allow the EAT system to access her mobile smart phone (or other similar electronic device) containing facial data (and/or other similar personal information and data) in order to scan some or all of her contacts (such as family, friends, work colleagues contained in her contact list, Facebook, LinkedIn and other social media and/or similar accounts) for the purpose of informing Sofia of whether there are any contacts (ie family/friends) sitting at an EAT Table in the same food court or near her and the exact location details including table number of the contact and directions.

NFC Readers (9) An NFC Reader[22] contained with the EAT table will interact with NFC and RFID[23] devices and/or other similar devices, including (but not limited to) mobile devices (smart phones) and contactless smart cards[24], NFC tags in Sofia's possession such as customer loyalty cards, bank cards, debit cards, credit cards and other cards with NFC tags in order to deliver relevant advertising content. NFC tags contained within packaging and other items such as the salad bowl which Sofia is eating out of will communicate with the NFC Reader contained with the EAT table thereby delivering relevant advertising content in line with the theme of Sofia's healthy eating habits such as an advertisement for gym membership specials for a new gym opening soon.

[22]Near field communication (NFC) is a set of standards for smartphones, credit cards, ATM cards and similar devices to establish radio communication with each other by touching them together or bringing them into proximity, usually no more than a few inches.

[23]Radio-frequency identification (RFID) is the wireless non-contact use of radio-frequency electromagnetic fields to transfer data, for the purposes of automatically identifying and tracking tags attached to objects. The tags contain electronically stored information.

[24]A contactless smart card is any pocket-sized card with embedded integrated circuits that can process and store data, and communicate with a terminal via radio waves.

Touchscreen

(10) Sofia can interact with the OLED (or other energy efficient) display screen which can be responsive to touch (i.e. A touchscreen). Sofia can select a number of topics such as information, News, weather, health, social media and shopping specials and other content. The topic selected by Sofia will determine the content that is displayed on the EAT table[25]. Sofia can also participate in e-commerce related activities.[26] Through touchscreen technology incorporated into the EAT table Sofia can participate in gaming (including online gaming) and other related socially engaging activities. These various activities carried out through the EAT Table by Sofia, such as Gaming for example, can occur between one or more occupants sitting at an EAT table across one or more EAT tables contained within one or more EAT venues throughout the world.

[25]There is an NFC transmitter that adapts to the current advertisement being displayed on EAT.

[26]For example, Internet Shopping.

NFC Technology

(11) The EAT table will possess a Contactless payment system[27] using, for example, NFC technology such as "tap and go" technology, goods and services can be purchased from businesses within and outside the shopping centre directly from EAT table. Whilst Sofia is having her lunch she can purchase a product from her EAT table which can be delivered to that particular EAT table using iBeacon technology[28].

[27]Contactless payment systems are credit cards and debit cards, key fobs, smartcards or other devices that use radio-frequency identification for making secure payments. The embedded chip and antenna enable consumers to wave their card or fob over a reader at the point of sale. Some suppliers claim that transactions can be almost twice as fast as a conventional cash, credit, or debit card purchase. Because no signature or PIN entry is typically required for contactless purchases under a certain amount (say $90 for example), research indicates that consumers are likely to spend more money due to the ease of small transactions.

[28]iBeacon is the Apple Trademark for an indoor positioning system.

Touchless Interaction

(12) Using a Raspberry Pi (and/or other similar microcomputers, computers and operating systems) hardware adaptation called "Hover", the EAT table can detect Sofia's hand movements in the air for touchless interaction with information and content displayed on the EAT table by just hovering her hand. Hover can recognize up, down, left and right swipes up to 5 inches away.

iBeacons

(13) The EAT System will contain iBeacon technology which is similar to Bluetooth Low Energy (BLE) that provides an opportunity to send customers highly contextual, hyper-local, meaningful messages and advertisements on their smartphones. When a person (i.e. Sofia) sits at an EAT table in a food court an App installed on her smartphone (herein referred to as "the App") listens for iBeacons and when it hears the iBeacon it triggers the iBeacon to send a push message that appears on Sofia's smartphone. The push message directs Sofia to open the APP which in turn enables Sofia's smartphone to display the latest push notifications[29] in real time and in synchronisation with the latest ads[30] displayed on the EAT table.

[29]For example, say the last five push notifications.

[30]For example, say the last five ads.

For example, Sofia whilst sitting at the EAT table eating her lunch views a video advertisement from a ladies fashion retail shop (displayed through the EAT table) which announces a huge sale at the shop entitling customers with special coupons up to 70% off all items. A push notification is then received on Sofia's smart phone with the link to download the coupon. Another scenario could be that Sofia receives a push notification stating "Special offer from ladies fashion retail shop" with a link to the ladies fashion retail shop Sale online where Sofia can then purchase goods on sale (and have those goods delivered directly to her EAT Table. Therefore Sofia can essentially complete multiple tasks and activities at the same time such as, for example, having lunch whilst shopping and socialising all at the same time. See below for further information.

uBeacons

(14) Unlike standard beacons, uBeacons, which also support the iBeacon standard, can receive a few kilobits per second of data back from customers' smartphones without pairing, and they can each talk via Bluetooth to other uBeacons. If one of the uBeacons is connected to the Internet, the uBeacons network can communicate with the cloud.

Voice Recognition

(15) Microphones strategically embedded/incorporated into the EAT Table are able to gather audio data from the external environment and perform conversation analysis through voice recognition software. Through conversation analysis the EAT Table can gather information and data from it's occupants and then provide advertisements (and other content) based on the content of that conversation in order to determine the most relevant and useful ads to be displayed. For example, Sofia is excited about her new holiday and is discussing flights with her friend and is planning a holiday, the content of this communication prompts a series of advertisements from various airlines and travel agents to appear through the EAT table.

EAT Table User and Retailer Experience—Summary of Sequence of Events:

1. Enter Food Court and sit at an EAT Table (It should be noted that prior to entering food court one can reserve a table through the EAT system and an App);
2. EAT Table establishes connection with Customer smart phone via an App;

3. Customer can view both commercial and non-commercial digital material through the EAT table, such as for example a trailer for a new movie or major news announcement, and can listen to the corresponding audio via a wireless connection (through an App) between the Customers Mobile Phone, Smart Phone or other electronic mobile communication device used by the Customer and the EAT Table;
4. Customer can order food/beverage (and/or other goods and/or services) directly to EAT table via App;
5. Food/beverage (and/or other goods and/or services) is delivered/provided directly to the customer at the relevant EAT table using a unique identifier coupled with a digital mapping system and GPS. For example: Sofia attends a Food Court and sits at EAT table number 70 and orders fruit salad from a food retailer (generating an order number, say order 10) in the food court. (See FIG. 17, showing a digital grid mapping system). Once the order is placed the EAT Table displays a digital timer indicating time left for the deliver (in this example, say 7 minutes). Using a digital mapping system, the food retailer is able to identify the exact location of Sofia and where she is sitting (i.e. EAT Table number 70) and can then deliver Order 10 to EAT Table number 70 (where Sofia is sitting), without the need for Sofia to wait in a (obstructive) queue within an often crowded shopping mall concourse. The EAT table can also provide a timer for the order. It should be noted that the digital mapping system also enables all shopping mall/centres retailers (food or otherwise) to view real time orders emanating from specific EAT Tables and to deliver those orders directly to the specific EAT Table using an electronic handheld device (such as a tablet for example) that guides the person delivering the specific order to the specific EAT table. All orders can have a timer set by the retailer. The timer is displayed as a digital timer on the EAT table. Using the above example, whilst Sofia is waiting 7 minutes for her lunch to be prepared and delivered to her, she is subjected to various marketing messages (and other commercial and non-commercial communications) from the EAT table such as, for example an umbrella sale on at a retail store (the said store being located within the shopping mall). Using the relevant App, Sofia can then decide to immediately take advantage of the offer, conveyed by the EAT Table and purchase a umbrella which then displays a (second) digital timer on the EAT Table (of say 10 minutes). The umbrella is then delivered by the store directly to Sofia's EAT Table (which has a unique identifier) using a digital mapping system (and GPS) within the 10 minute time limit set by the retailer (i.e. the retail store), if the umbrella is not delivered on time (i.e. within the 10 minute time limit set by the retailer, then Sofia will receive a notification on her mobile device from the relevant app confirming that the order has gone over time and informing Sofia that she can choose from a list (presented) to Sofia with the following three (3) options:
(a) to continue waiting for a further additional period of time, with the said time period being set by the retailer (say for example a further 10 minutes); or
(b) choose to attend the shop and collect the umbrella; or
(c) choose to have the umbrella delivered to her home (delivery can be free or paid).

If Sofia chooses option (a) above then further time (as set by the retailer) is added to the digital timer and the process starts again. For the sake of clarity it is important to note that the consumer is aware of all time periods set by the retailer prior to placing an order and prior to choosing option (a).

If Sofia choose option (b) then she can simply leave the EAT table and receive delivery of the umbrella to her home at a later date. All of Sofia's contact details, including her delivery address, are automatically provided by the retailer automatically through the relevant App used on Sofia's mobile device.

Essentially Sofia is using her time much more effectively and has carried out more than one different activities/tasks at the same time, that is, shopping whilst having lunch and socialising. This equates to significant time savings.

Loyalty Rewards Program—Vouchers & Gift Cards

Customers with the relevant app are able to take advantage of the loyalty rewards program. That is, vouchers, gift cards and other rewards are given to a customer at a food court based on one or more of the following:
i. frequency (day/time) and duration of visits to food court; and/or
ii. total amount spent (on goods/services including food and beverage) at Food Court through the EAT table; and/or
iii. activities of both a commercial and non-commercial nature undertaken by a customer whilst at the food court and/or venue in which the food court is hosted.
For example, if Sofia frequents the Food Court 5 days per week Monday to Friday, between the hours of 12:00 pm and 2:00 pm for minimum time of 20 minutes at one time, and spends a total of say $100 (per week) then she is offered a $5.00 gift card to use at any store within the Shopping Centre.
Some further notes in relation to the User experience:
(a) Various commercial and non-commercial messages are (Push) Messages are received from iBeacon, UBeacons and/or other BLE devices contained within (or near) the EAT Table
(b) Push Message received from iBeacon prompting (reminding) the App to be open/activated (in order to receive special offers corresponding with ads displayed through the EAT table)
(c) Push Message received from App containing special offers and other similar content, that correspond with the latest advertisements being displayed through the EAT table
(d) Customer clicks on one push message
(e) Customer is taken to a site where the customer can:
a. carry out various sales transactions—goods & services are purchased (The App contains all payment details, full name and address details for delivery of goods to the Customer);
b. obtain further information on the advertisement/announcements;
c. download the latest up-to-the-minute Coupons/vouchers and/or other discounts and information on smart phone or other similar electronic device;
d. purchase tickets to various events/shows/movies/attractions can be purchased;
e. Participate in surveys;
f. participate in trade promotions etc.;
g. enter various competitions/draws/lotteries;
h. download a game or any other app';
i. announcements, latest news on all topics and other similar and/or related matters, that can be viewed further;
j. subscribe to newsletters etc.;
k. sign-up as a member;

l. vote;

m. participate in various online forum discussions;

n. connect with social media sites;

o. carry out other online transactions.

Other Functionality of the EAT Table and the EAT Table System:

Hyperlocal "Check In"

(16) When Sofia is sitting at the EAT table she can check in her EAT table number through the relevant app contained within her Smartphone device (or other electronic device). The app will then send a notification containing the precise location and even table number to one or more of Sofia's phone contacts and/or social media contacts (including family and friends) who also have the same app as Sofia. This will enable Sofia's friends to be obtain specific directions (and instructions) to meet at a specific table number within a specific venue (such as, for example, table 20 at food court on level 1 of a domestic airport).

Hyper Local Social Interaction

(17) Whilst sitting at an EAT Table, using the EAT Table mapping system, Sofia can send a short (text) message (or similar message) through her portable electronic device[31] to one or more EAT table numbers that are then displayed on that EAT Table. Using facial recognition technology, Sofia can socialise with other people her age (and even gender) through the EAT Table. Sofia can engage in all sorts or social activity such as writing reviews on goods and services, gaming and other recreational activities such as chess (for example)—all through the EAT Table system.

[31]For example; a mobile phone, laptop, tablet and/or other electrical communication technology including embedded electrical communication technology.

Another feature of the hyper-local social networking that can occur within the EAT system is the enabling of messages to be sent from EAT Tables and received and displayed on other EAT Tables. For example, a person sitting at say Table 74 can send a message saying 'Hi' to the person sitting at say Table 63 (See figure titled: Hyper-Local Social Networking). This message is then displayed on the electronic display device (i.e. the digital screen embedded in the table top). Messages can only be sent and received on a consensual basis. That is, before Table 63 receives the actual message, Table 63 is asked whether they would like to accept messages from Table 74 (or any other table). A small portion of the digital display screen can be allocated to display electronic messages and other content received from other devices/tables.

Digital Mapping—Hyper Local Micro-Navigation (HLM)[32]

[32]Digital Mapping using Hyper local micronavigation to create a digital map. Digital mapping is used to provide a map that gives accurate representations of the layout of a food court (or other similar venue) containing EAT Tables. Digital Mapping is used to assist with the delivery of goods and/or services to the person(s) occupying a EAT Table through hyper local micronavigation.

(18) Taking a Large food court in a shopping mall as an example, using hyperlocal indexing one can not only find the food court itself but also a specific EAT table number within the food court.

HLM will enable goods and services purchased at an EAT table to be delivered directly to that EAT table number. Sofia can therefore take advantage of promotions and/or other offers displayed through the EAT Table and purchase goods and services from local retailers (and engage in other online and/or e-commerce related activities) whilst at the EAT Table which can then be delivered directly to Sofia at her EAT table by the local retail shop using digital mapping and HLM.

Not only will retailers have access to the hyper-local micro-navigation system for the purpose of delivering goods and/or services ordered from the EAT Table, but anyone else who has the relevant App can view the layout of the venue they are in and receive information directing them to a specific EAT table within the venue (see figure titled: 'Hyper-local micro-navigation').

EAT Table Clustering & Unison

(19) EAT Tables can work together in unison so that they can be viewed as a single system. The EAT Tables can work together to produce large (animated) digital displays so that advertisements and other content can be visible to other people who are not sitting at the EAT Table.

EAT Table Grid Computing

(20) EAT Tables can be used for grid computing thereby providing a means for offering information technology as a utility for both commercial and non-commercial businesses, with those businesses paying for only what they use.

EAT Table Synchronisation & Collaboration

(21) The EAT Table can deliver content and data in synchronisation and collaboration with other EAT tables within an EAT eco-system. For example, EAT tables within a particular venue can be synchronised (synchronization of processes, and synchronization of data) to display advertisements, promotions, news, content and other data using one or more EAT tables (at a specific date, time and place). For example, an advertisement for the launch of a new electric car can show the car travelling from EAT Tabletop to EAT Tabletop thereby creating an eye-catching advertisement. The EAT tables can also be used to provide guidance and direction to customers. For example, in case of an emergency, the EAT Tabletops can provide (animated) directions (in real-time) to the nearest exit and/or fire escape.

Warning System—Emergency Alert Table (EAT)

(22) The EAT Table can also be used to provide various emergency alerts that act as an early warning system with respect to fire, natural disasters, terrorism and other matters concerning safety. Users sitting at an EAT Table can be provided with immediate notification of any threats or dangers affecting them through an emergency alert broadcast displayed on the EAT table. The EAT tables can be programmed to synchronise and 'light-up' the path to the nearest emergency (fire) exit and provide directions/instructions in the form of illuminated arrows depicted on the digital screens within the EAT tabletops (see figure titled: 'Synchronisation'). The process of synchronisation can also occur when displaying advertising and other content using more than one EAT Table at one time.

In the event of a power 'black-out' (or similar situation) the EAT tables can be connected to isolated 'back up' power source which may include a diesel powered electric generator and/or gas powered electric power generator.

The EAT Tables can work together to produce light (through the provision of back/up power and/or both external and/or internal batteries utilised by the EAT Table) in the even that there is a blackout.

The EAT Tables can also come fitted with smoke detectors and/or other similar detectors to detect and alert the EAT Table occupant of any possible, potential and/or other real threats from the external environment.

The EAT table can also provide live and up-to-the-minute weather notifications including major weather warnings such as torrential rain and hail.

The EAT Table can be used by local authorities to search for people such as missing persons and fugitives, through making detailed pictorial announcements in real-time and at any time.

Data Collection/Data Mining

(23) The EAT Table/System can be used to collect (and store) data from the external environment including all information in relation to the Customer including, but not limited to:

Customers approximate age
gender
preferences/interests
dietary habits
shopping/buying habits
Time spent at the table
Commercial activities
Social activities
Frequency and duration of visits to EAT Table
Transactions
Other behaviour(s)

The EAT Table can gather all other relevant information pertaining to the Customer in accordance with relevant privacy laws. This data can be used, among other things, to provide the Customer with more relevant and useful advertising (and information) through the EAT table (in accordance with relevant privacy laws) thereby creating a more engaging experience between the subject venue (such as a shopping mall) and the Customer.

Eye Tracking

(24) Camera's connected to the EAT table can also detect and trace eye movement and use that data to develop heat maps that depict which parts of the EAT table including advertisements (and other content) are viewed most by the consumer. Eye tracking technology can obtain information in relation to the consumers reaction to advertisements and other content displayed through the EAT Table. It can also gather information such as blink frequency and changes in pupil diameter, both of which are also detected by the eye tracker. The aggregated data is written to a file that is compatible with eye-tracking analysis software. Eye tracking software can prove to be extremely useful when determining the effectiveness of an advertisement (and other content) displayed through the EAT Table.

IoT—Internet of Things

(25) The EAT can be connected to the Internet of things. The EAT table is IoT compatible and can be built to meet the standards developed by International Telecommunications Union's Internet-of-Things Global Standards Initiative. The Global Standards Initiative on Internet of Things (IoT-GSI) promotes a unified approach in ITU-T for development of technical standards (Recommendations) enabling the Internet of Things on a global scale. ITU-T Recommendations developed under the IoT-GSI by the various ITU-T Questions—in collaboration with other standards developing organizations (SDOs)—will enable worldwide service providers to offer the wide range of services expected by this technology. IoT-GSI also aims to act as an umbrella for IoT standards development worldwide.

Future Advancements, Adaptation & Enhancements to EAT:

Biochips

(26) The EAT table can contain Biochips or DNA chips strategically embedded in the table top so that if Sofia selects the "health" topic (whilst Sofia's skin on any part of her hand or arms makes contact with the EAT table), content displaying a snapshot of her current state of health and current dietary requirements are then displayed (after Sofia's skin makes contact with the EAT table) as well is relevant advertisements (e.g. Vitamin and Pharmacy store sales). For example, Sofia sits an EAT table in the food court. Sofia's arms come into contact with bio-chips imbedded in the table top. Bio-chip detects vitamin D deficiency in Sofia prompting tailored advertising such as an ad from a Chemist promoting Vitamin D tablet specials.

Smell Recognition—Electronic Nose

(27) The EAT Table can contain smell sensors that detect and recognise smell from the external environment (such as food and beverage placed on the EAT Table) and can use that data to better understand the external environment and those occupant(s) sitting at the EAT table in order to provide relevant and useful information to the occupant(s) of the EAT Table. The recognition process follows stages similar to human olfaction and are performed for identification, comparison, quantification and other applications, including data storage and retrieval.

Scent Delivery System

The EAT Table can also contain a Scent Delivery System within the body of the table. The SDS can be used for Scent marketing. For example a coffee advertisement being displayed can simultaneously provide a pleasant coffee scent the SDS to the occupant(s) of the table.

Biosensors

(28) The EAT table may contain other biosensors (that mimic human sensors) used for the purpose of gathering data in relation to the external environment. The smell sensors will also help the EAT table to better understand those occupant(s) sitting at the table. For example, the food and beverage being consumed at the EAT table can be analysed through the biosensors (smell sensor) in order to serve relevant and useful content to the occupant(s) sitting at the EAT Table.

IC Chips & Communication with External Environment—NFC and RFID Capabilities—Smart Label Readers

(29) With the advancements in nanotechnology IC chips and/or RFID chips contained within various products and items can be used to communicate with the EAT table thereby serving the customer meaning advertisements and other information of relevance and importance to the customer. Take for example the following 2 scenarios:

(a) Sofia purchases a Salad from "The Salad Bar" and sits down at an EAT table in the food court. The EAT table communicates with the IC Chip embedded within the Salad bowl thereby prompting ads in line with healthy eating habits such as advertisements health fruit juices on special at "The Juice Store" or fruit and veg sale at the new Supermarket or one month free vouchers for access to a new gym opening soon.

(b) Sofia sits at the EAT table and the IC embedded in Sofia's Gym membership card communicates with the EAT table informing Sofia to renew her gym membership and current gym membership sale promotion of 50% off all gym renewals.

Hologram Technology and Holographic Displays

(30) Holographic (both static and dynamic holograms) displays including Holographic video displays produced through one or more holographic techniques such as 3D holographic projection and Specular holography (is a related technique for making three-dimensional images by controlling the motion of specularities on a two-dimensional surface).

The invention claimed is:

1. A content display system including:
a plurality of display devices each including at least one sensor, wherein each of the plurality of display devices is or forms part of a respective one of a plurality of tables and the at least one sensor includes an attendance sensor configured to detect attendance of at least one user at the table and to output a value representing whether a table is attended or unattended; and at least one processing unit configured to process information received from the at least one sensor, and to determine a location value for each display device indicative of the position of each display device with respect to the rest of the plurality of display devices, wherein the plurality of display devices are configured to display content dependent on information received from the at least one sensor, and wherein the at least one processing unit and the plurality of display devices are configured to display content dependent at least on location values for each of the plurality of display devices and the detected attendance of at least one user at each of the plurality of tables such that unattended neighboring display devices of the plurality of display devices collectively display a single piece of content, whereby a number of unattended neighboring display devices is determined in dependence on the value representing whether a table is attended or unattended, wherein each display device of the number of unattended neighboring display devices displays a respective portion of the single piece of content, and wherein the single piece of content is configured to be completely displayed by the number of unattended neighboring display devices.

2. A content display system as claimed in claim 1 wherein:
the at least one processing unit is configured to determine a grouping value for each display device based on information from the at least one sensor; and
the plurality of display devices are configured to display content dependent on their grouping value.

3. A content display system as claimed claim 2, wherein the at least one processing unit is configured to generate a cluster value for each display device dependent on its grouping value and location value.

4. A content display system as claimed in claim 3, wherein display devices are allocated the same cluster value if they have the same grouping value and are physically located adjacent one another.

5. A content display system as claimed in claim 3, wherein the display devices are configured to display content dependent on their cluster value.

6. A content display system as claimed in claim 5, wherein display devices with the same cluster value are configured to display coordinated or synchronised content or to collectively display content.

7. A content display system as claimed in claim 1, wherein the at least one sensor is configured to detect information relating to at least one user at a predetermined observation position in the vicinity of the display device.

8. A content display system as claimed in claim 7, wherein each of the plurality of display devices include:
the attendance sensor configured to detect the presence or absence of said at least one user at a predetermined observation position in the vicinity of the display device; and
at least one user demographic or characteristic sensor configured to detect information related to the demographic or characteristics of a user(s) when at a predetermined observation position in the vicinity of the display device.

9. A content display system as claimed in claim 1, wherein each of the display devices includes a processing unit.

10. A content display system as claimed in claim 1, wherein each of the display devices includes a communication interface that permits data communication between the plurality of display devices and additionally with external devices.

11. A content display system as claimed in claim 1, including a server in communication with the plurality of the display devices.

12. A content display system as claimed in claim 3, further including a server configured to allocate content to each display device based on the cluster value of each display device.

13. A content display system as claimed in claim 8, wherein the at least one user demographic or characteristic sensor includes an image sensor.

14. A content display system as claimed in claim 8, wherein the at least one user demographic or characteristic sensor includes a sound sensor.

15. A content display system as claimed in claim 1, wherein the attendance sensor includes a proximity sensor.

16. A content display system as claimed in claim 1, wherein each display device comprises a camera and facial recognition technology to determine a demographic of the at least one user, wherein the at least one processing unit and the plurality of display devices are configured to display content based on the demographic of the at least one user.

17. A content display system as claimed in claim 1, wherein the content based on the demographic of the at least one user is targeted advertising.

* * * * *